United States Patent
Harding

(10) Patent No.: US 10,260,749 B2
(45) Date of Patent: *Apr. 16, 2019

(54) COMBUSTION CHAMBER WALL AND A METHOD OF MANUFACTURING A COMBUSTION CHAMBER WALL

(71) Applicant: ROLLS-ROYCE PLC, London (GB)

(72) Inventor: Stephen Charles Harding, Bristol (GB)

(73) Assignee: ROLLS-ROYCE plc, London (GB)

(*) Notice: Subject to any disclaimer, the term of this patent is extended or adjusted under 35 U.S.C. 154(b) by 852 days.

This patent is subject to a terminal disclaimer.

(21) Appl. No.: 14/608,943

(22) Filed: Jan. 29, 2015

(65) Prior Publication Data
US 2015/0241062 A1    Aug. 27, 2015

(30) Foreign Application Priority Data
Feb. 27, 2014 (GB) .................... 1403404.5

(51) Int. Cl.
*F23R 3/00* (2006.01)
*B22F 3/105* (2006.01)
(Continued)

(52) U.S. Cl.
CPC .............. *F23R 3/002* (2013.01); *B22F 3/105* (2013.01); *B22F 3/1055* (2013.01); *B22F 5/009* (2013.01);
(Continued)

(58) Field of Classification Search
CPC .. F23R 3/002; F23R 3/007; F23R 3/02; F23R 2900/00018; F23R 2900/03042; F23R 2900/03044
See application file for complete search history.

(56) References Cited

U.S. PATENT DOCUMENTS 2,919,549 A    1/1960   Haworth et al.
4,614,082 A *  9/1986   Sterman .................. F23R 3/002
                                              60/752
(Continued)

FOREIGN PATENT DOCUMENTS

DE   10 2010 041 284 A1   3/2012
EP       1 221 574 A2     7/2002
(Continued)

OTHER PUBLICATIONS

Jun. 30, 2015 Extended Search Report issued in European Application No. 15 152 992.2.
(Continued)

*Primary Examiner* — Laert Dounis
(74) *Attorney, Agent, or Firm* — Oliff PLC

(57) ABSTRACT

A combustion chamber wall is hollow, has a first surface and a second surface and includes a plurality of polyhedron shaped chambers defined by a matrix of integral interconnected walls. The walls of the chambers in a first layer define the first surface of the combustion chamber wall and the walls of the chambers in a third layer define the second surface of the combustion chamber wall. The chambers are fluidly interconnected by apertures extending through the integral interconnected walls of the chambers for the flow of coolant there-between. The walls of the chambers in the first layer have apertures extending there-through to supply coolant into the first layer and the walls of the chambers in the third layer have apertures extending there-through to supply coolant from the third layer into the combustion chamber. The combustion chamber wall is manufactured by additive layer manufacture.

28 Claims, 11 Drawing Sheets

(51) Int. Cl.
    *B22F 5/00*      (2006.01)
    *B22F 5/10*      (2006.01)
    *C21B 9/04*      (2006.01)

(52) U.S. Cl.
    CPC ........ *B22F 5/10* (2013.01); *B22F 2003/1054* (2013.01); *C21B 9/04* (2013.01); *F23R 2900/00018* (2013.01); *F23R 2900/03042* (2013.01); *Y02P 10/295* (2015.11); *Y10T 29/49231* (2015.01)

(56) References Cited

U.S. PATENT DOCUMENTS

| | | |
|---|---|---|
| 5,216,886 A | 6/1993 | Ewing |
| 7,402,335 B2 | 7/2008 | Bolms et al. |
| 9,498,848 B2 * | 11/2016 | Garry .................. B22F 5/009 |
| 2005/0076644 A1 | 4/2005 | Hardwicke et al. |
| 2006/0053798 A1 | 3/2006 | Hadder |
| 2007/0275210 A1 | 11/2007 | Heselhaus |
| 2011/0016869 A1 * | 1/2011 | Iwasaki .................. F23R 3/002 60/752 |
| 2012/0237786 A1 | 9/2012 | Morrison et al. |
| 2012/0275900 A1 | 11/2012 | Snider et al. |

FOREIGN PATENT DOCUMENTS

| | | |
|---|---|---|
| EP | 1 533 113 A1 | 5/2005 |
| EP | 2017533 A1 | 1/2009 |
| EP | 2199725 A1 | 6/2010 |

OTHER PUBLICATIONS

Aug. 28, 2014 Search Report issued in British Application No. GB1403404.5.

* cited by examiner

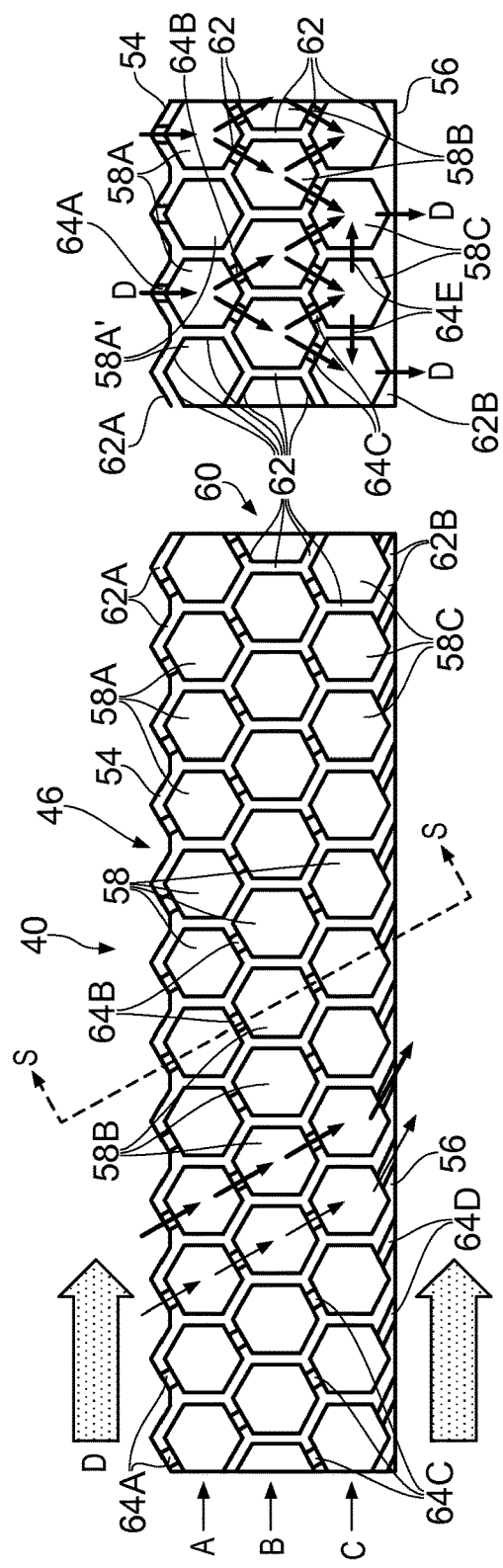

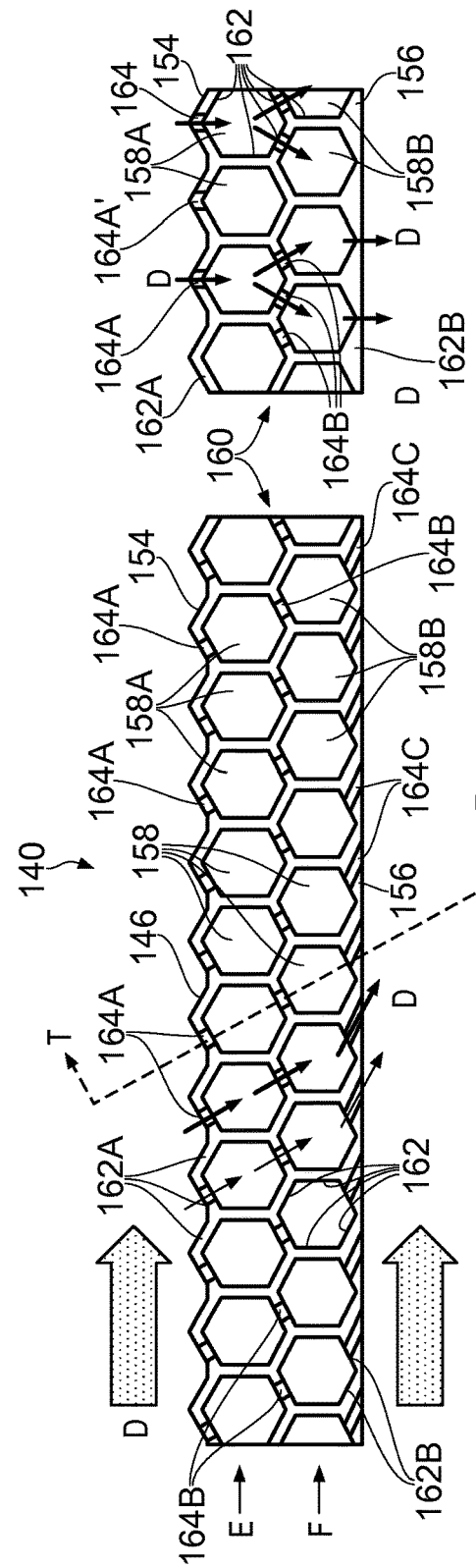

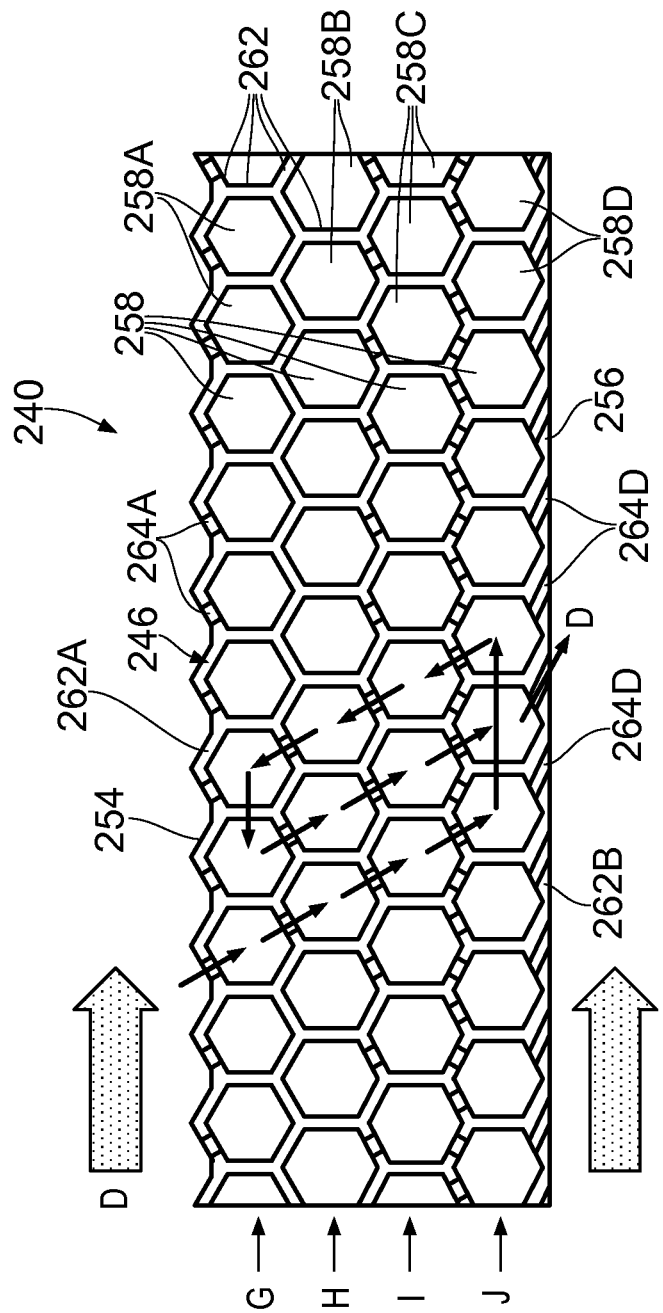

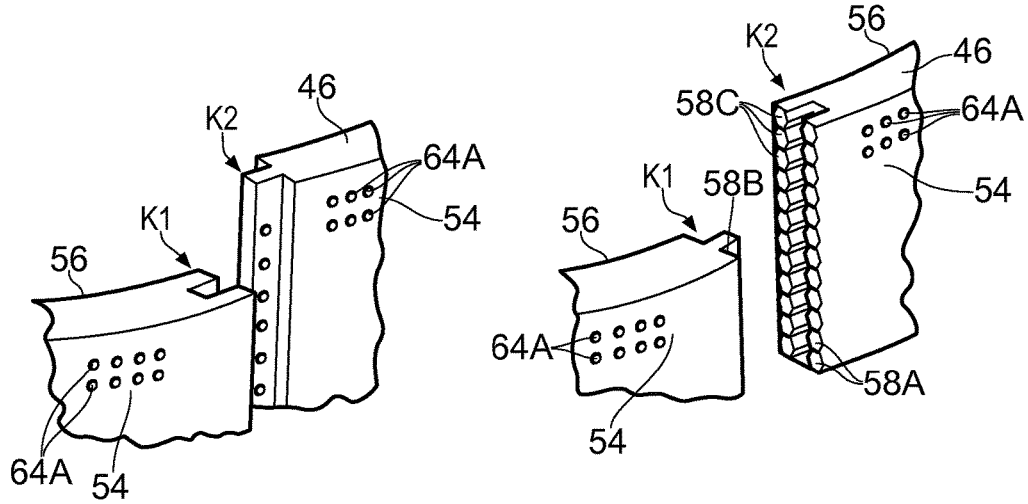
FIG. 12
FIG. 13
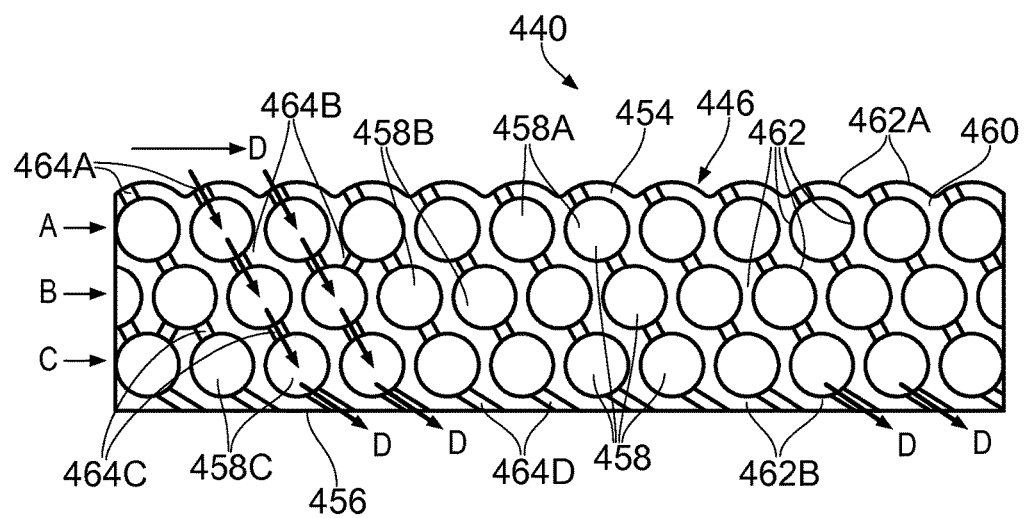
FIG. 16

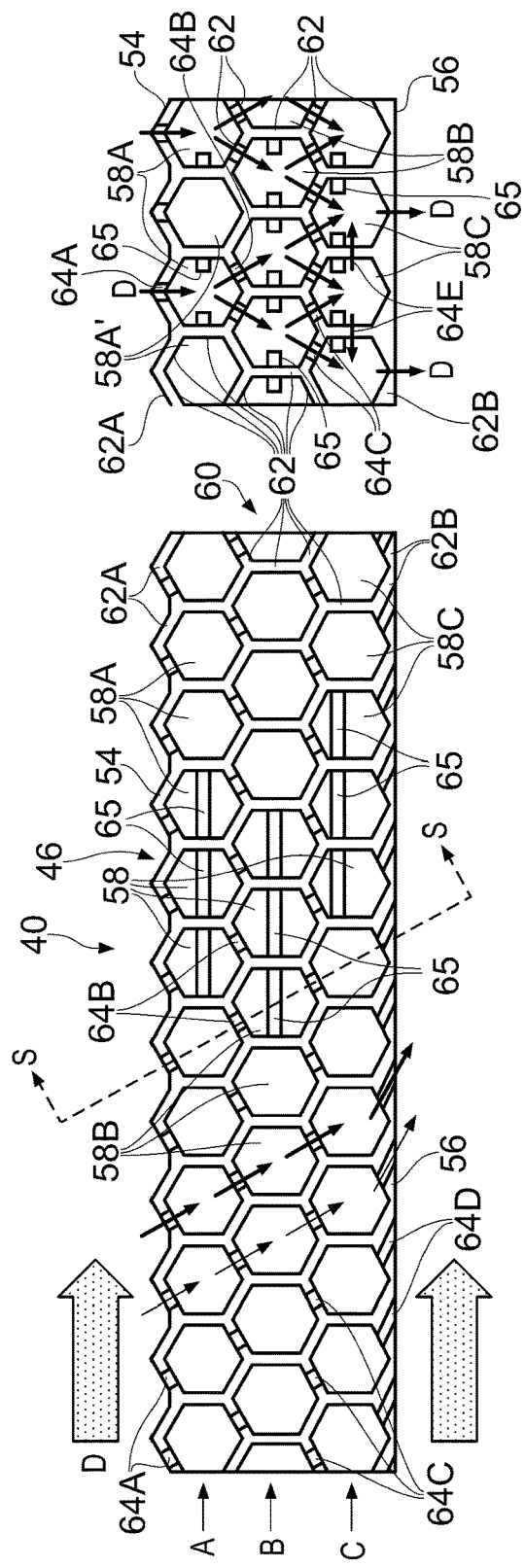

COMBUSTION CHAMBER WALL AND A METHOD OF MANUFACTURING A COMBUSTION CHAMBER WALL

FIELD OF THE INVENTION

The present disclosure relates to a combustion chamber wall and a method of manufacturing a combustion chamber wall and in particular to a gas turbine engine combustion chamber wall and a method of manufacturing a gas turbine engine combustion chamber wall.

BACKGROUND TO THE INVENTION

Gas turbine engine combustion chambers conventionally comprise an outer annular wall structure and an inner annular wall structure. The outer annular wall structure for example comprises an outer annular wall upon which are secured a plurality of tiles. The tiles are generally arranged circumferentially adjacent to each other in a plurality of axially adjacent rows. The inner annular wall structure is similar to the outer annular structure.

The outer annular wall is conventionally produced by forging and turning of a metal billet to produce the outer annular wall or by welding fabricated metal components together to produce the outer annular wall. The outer annular wall is generally provided with dilution apertures, cooling apertures and mounting apertures by machining, electro-chemical machining, electro discharge machining, laser machining etc. The inner annular wall is conventionally produced by casting a plurality of tiles which are subsequently mounted on the outer annular wall. The tiles are generally produced by casting and the tiles are provided with cooling apertures by machining, electrochemical machining, electro discharge machining, laser machining etc.

These combustion chamber walls are mechanically complex, are heavy, are expensive and require complex manufacturing procedures.

Therefore the present disclosure seeks to provide a novel combustion chamber wall which reduces or overcomes the above mentioned problem.

STATEMENTS OF INVENTION

Accordingly the present disclosure provides a combustion chamber wall, the combustion chamber wall is hollow and has a first surface and a second surface, the combustion chamber wall comprises a plurality of polyhedron shaped chambers defined by a matrix of integral interconnected walls, the polyhedron shaped chambers are arranged in at least two layers between the first surface and the second surface, the integral interconnected walls of the polyhedron shaped chambers in a first layer defining the first surface of the combustion chamber wall, the integral interconnected walls of the polyhedron shaped chambers in a second layer defining the second surface of the combustion chamber, the polyhedron shaped chambers in each layer are fluidly interconnected to the polyhedron shaped chambers in each adjacent layer by apertures extending through the integral interconnected walls of the polyhedron shaped chambers for the flow of coolant there-between, adjacent polyhedron shaped chambers share a common wall, the integral interconnected walls of the polyhedron shaped chambers in the first layer have apertures extending there-through from the first surface to supply coolant into the first layer and the integral interconnected walls of the polyhedron shaped chambers in the second layer have apertures extending there-through to the second surface to supply coolant from the second layer into the combustion chamber.

All the polyhedron shaped chambers may have the same shape.

The polyhedron shaped chambers may be parallelogram sided cuboid shaped chambers, square based pyramid shaped chambers, rhombic dodecahedron shaped chambers, elongated dodecahedron shaped chambers, truncated dodecahedron shaped chambers, spherical shaped chambers, spheroid shaped chambers or two types of polyhedron shaped chambers, for example two types of irregular polyhedron shaped chambers arranged in a Weaire-Phelan structure. A Weaire-Phelan structure comprises irregular dodecahedron shaped chambers with pentagonal faces possessing tetrahedral symmetry and tetrakaidecahedron shaped chambers with two hexagonal faces and twelve pentagonal faces possessing anti-prismatic symmetry. Spheroid shaped chambers includes elliptical or similar shaped chambers.

The polyhedron shaped chambers may be elongated dodecahedron shaped chambers, the elongated dodecahedron shaped chambers are elongated in a longitudinal direction of the combustion chamber, there are three layers of elongated dodecahedron shaped chambers, the elongated dodecahedron shaped chambers in the first layer are adjacent the elongated dodecahedron shaped chambers in the second layer and the elongated dodecahedron shaped chambers in the third layer are longitudinally between two rows of elongated dodecahedron shaped chambers in the first layer and two rows of elongated dodecahedron shaped chambers in the second layer.

The polyhedron shaped chambers may be rhombic dodecahedron shaped chambers.

The rhombic dodecahedron shaped chambers and elongated dodecahedron shaped chambers may not have any horizontal facets, or walls, for the polyhedron shaped chambers and all the walls, or facets, of the polyhedron shaped chambers are at an angle of 45° to the horizontal plane or at an angle of 45° the direction of build.

The thickness of the wall of the polyhedron shaped chamber may be in the range of 0.2 to 2 mm.

The distance between the walls of the polyhedron shaped chambers may be in the range of 1 to 4 mm.

One or two layers of polyhedron shaped chambers may be provided between the first layer and the second layer.

The first surface of the wall may be multi-faceted and the facets are defined by the walls of the polyhedron shaped chambers in the first layer.

Some of the facets may be defined by the walls of the polyhedron shaped chambers in the first layer face in an upstream direction, the facets facing in an upstream direction have apertures extending there-through to supply coolant into the first layer.

The apertures in the facets facing in an upstream direction may have the same cross-sectional area as the facets such that the facets facing in a downstream direction form scoops to supply coolant into the first layer.

The first surface may have at least one rib extending there-from in a direction away from the second surface.

The first surface may be corrugated.

The second surface may be cylindrical, the downstream walls of the polyhedron shaped chambers defining the second surface have apertures extending there-through to supply coolant from the second layer in a downstream direction into the combustion chamber.

The apertures in the downstream walls of the polyhedron shaped chambers defining the second surface may have the same cross-sectional area as the downstream walls of the polyhedron shaped chambers.

The apertures may be fan shaped and the fan shape diverges in a direction perpendicular to the downstream direction.

At least one of the polyhedron shaped chambers may have one or more ribs extending from at least one of the walls of the at least one of the polyhedron shaped chambers into the respective polyhedron shaped chamber.

A plurality of the polyhedron shaped chambers may have one or more ribs extending from at least one of the walls of the polyhedron shaped chambers into the respective polyhedron shaped chambers.

The combustion chamber wall may be formed from a nickel base superalloy, a cobalt base superalloy or an iron base superalloy.

A thermal barrier coating may be provided on the second surface of the combustion chamber wall.

The thermal barrier coating may comprise a ceramic material.

The ceramic material may comprise zirconia or stabilised zirconia.

The combustion chamber may be a gas turbine engine combustion chamber.

The present disclosure also provides a method of manufacturing a combustion chamber wall, the combustion chamber wall is hollow and has a first surface and a second surface, the combustion chamber wall comprises a plurality of polyhedron shaped chambers defined by a matrix of integral interconnected walls, the polyhedron shaped chambers are arranged in at least two layers between the first surface and the second surface, the integral interconnected walls of the polyhedron shaped chambers in a first layer defining the first surface of the combustion chamber wall, the integral interconnected walls of the polyhedron shaped chambers in a second layer defining the second surface of the combustion chamber, the polyhedron shaped chambers in each layer are fluidly interconnected to the polyhedron shaped chambers in each adjacent layer by apertures extending through the integral interconnected walls of the polyhedron shaped chambers for the flow of coolant there-between, adjacent polyhedron shaped chambers share a common wall, the integral interconnected walls of the polyhedron shaped chambers in the first layer have apertures extending therethrough from the first surface to supply coolant into the first layer and the integral interconnected walls of the polyhedron shaped chambers in the second layer have apertures extending there-through to the second surface to supply coolant from the second layer into the combustion chamber, the method comprising (a) depositing layers of a metal sequentially one upon the other to form layers of a spiral wall, depositing each layer of metal in a spiral pathway, and (b) joining the ends of the spiral wall to form an annular wall, the ends of the spiral wall being at the opposite ends of the spiral pathway.

Step (b) may comprise rolling the spiral wall into a ring before joining the ends of the spiral wall together.

Preferably step (a) comprises:—
(i) depositing a layer of a metal powder onto a platform,
(ii) directing a radiation beam in at least one spiral pathway onto the layer of metal powder deposited in step (i) to melt and sinter the metal powder to form a layer of the spiral wall,
(iii) depositing a further layer of a metal powder onto the previously deposited layer of metal powder,
(iv) directing a radiation beam in at least one spiral pathway onto the layer of powder metal deposited in step (iii) to melt and sinter the metal powder to form a further layer of the spiral wall and to bond the further layer of metal powder to the previously deposited layer of metal powder, and
(v) repeating steps (iii) and (iv) a plurality of times to build up the spiral wall.

Preferably step (ii) comprises directing a laser beam onto the layer of metal powder, directing a microwave beam onto the layer of metal powder or directing an electron beam onto the layer of metal powder.

Preferably step (iv) comprises directing a laser beam onto the layer of metal powder, directing a microwave beam onto the layer of metal powder or directing an electron beam onto the layer of metal powder.

The present disclosure also provides a method of manufacturing a combustion chamber wall, the combustion chamber wall is hollow and has a first surface and a second surface, the combustion chamber wall comprises a plurality of polyhedron shaped chambers defined by a matrix of integral interconnected walls, the polyhedron shaped chambers are arranged in at least two layers between the first surface and the second surface, the integral interconnected walls of the polyhedron shaped chambers in a first layer defining the first surface of the combustion chamber wall, the integral interconnected walls of the polyhedron shaped chambers in a second layer defining the second surface of the combustion chamber, the polyhedron shaped chambers in each layer are fluidly interconnected to the polyhedron shaped chambers in each adjacent layer by apertures extending through the integral interconnected walls of the polyhedron shaped chambers for the flow of coolant there-between, adjacent polyhedron shaped chambers share a common wall, the integral interconnected walls of the polyhedron shaped chambers in the first layer have apertures extending therethrough from the first surface to supply coolant into the first layer and the integral interconnected walls of the polyhedron shaped chambers in the second layer have apertures extending there-through to the second surface to supply coolant from the second layer into the combustion chamber, the method comprising manufacturing the combustion chamber wall by additive layer manufacture.

The method may comprise directing a laser beam onto the layers of metal powder, directing a microwave beam onto layers of metal powder or directing an electron beam onto layers of metal powder.

The polyhedron shaped chambers may be rhombic dodecahedron shaped chambers and elongated dodecahedron shaped chambers, the method comprising building the walls, or facets, of the polyhedron shaped chambers at an angle of 45° to the horizontal plane or at an angle of 45° the direction of build.

BRIEF DESCRIPTION OF THE DRAWINGS

The present disclosure will be more fully described by way of example with reference to the accompanying drawings, in which:—

FIG. 3 is a further enlarged cross-sectional view of the combustion chamber in FIG. 2 showing a first combustion chamber wall according to the present disclosure.

FIG. 4 is cross-sectional view in the direction of arrows S through the first combustion chamber wall in FIG. 3.

FIG. 5 is a further enlarged cross-sectional view of the combustion chamber in FIG. 2 showing a second combustion chamber wall according to the present disclosure.

FIG. 6 is cross-sectional view in the direction of arrows T through the first combustion chamber wall in FIG. 5.

FIG. 7 is a further enlarged cross-sectional view of the combustion chamber in FIG. 2 showing a third combustion chamber wall according to the present disclosure.

FIG. 12 is an enlarged perspective view of the ends of the wall of the combustion chamber shown in FIG. 2 during the manufacturing process.

FIG. 13 is an enlarged perspective view of alternative ends of the wall of the combustion chamber shown in FIG. 2 during the manufacturing process.

FIG. 16 is a further enlarged cross-sectional view of the combustion chamber in FIG. 2 showing a fifth combustion chamber wall according to the present disclosure.

FIG. 17 is a further enlarged cross-sectional view of the combustion chamber in FIG. 2 showing a first combustion chamber wall including ribs.

FIG. 18 is cross-sectional view in the direction of arrows S through the first combustion chamber wall in FIG. 17.

DETAILED DESCRIPTION

Figure 1:
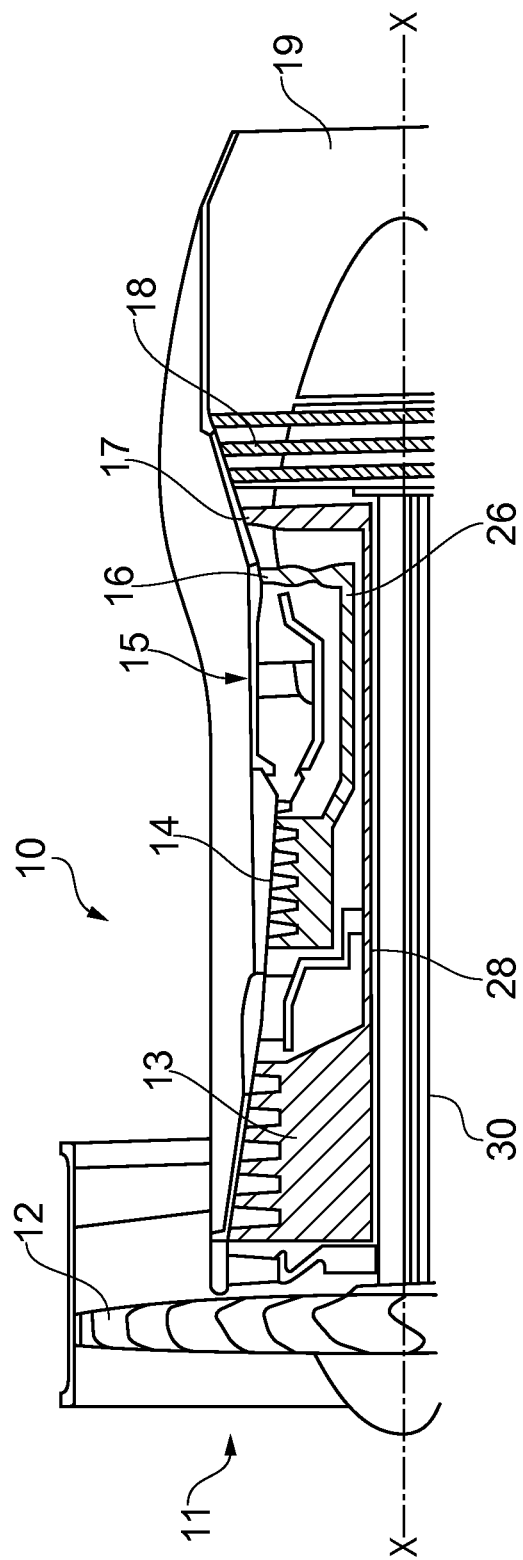
FIG. 1 is partially cut away view of a turbofan gas turbine engine having a combustion chamber wall according to the present disclosure.

A turbofan gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

Figure 2:
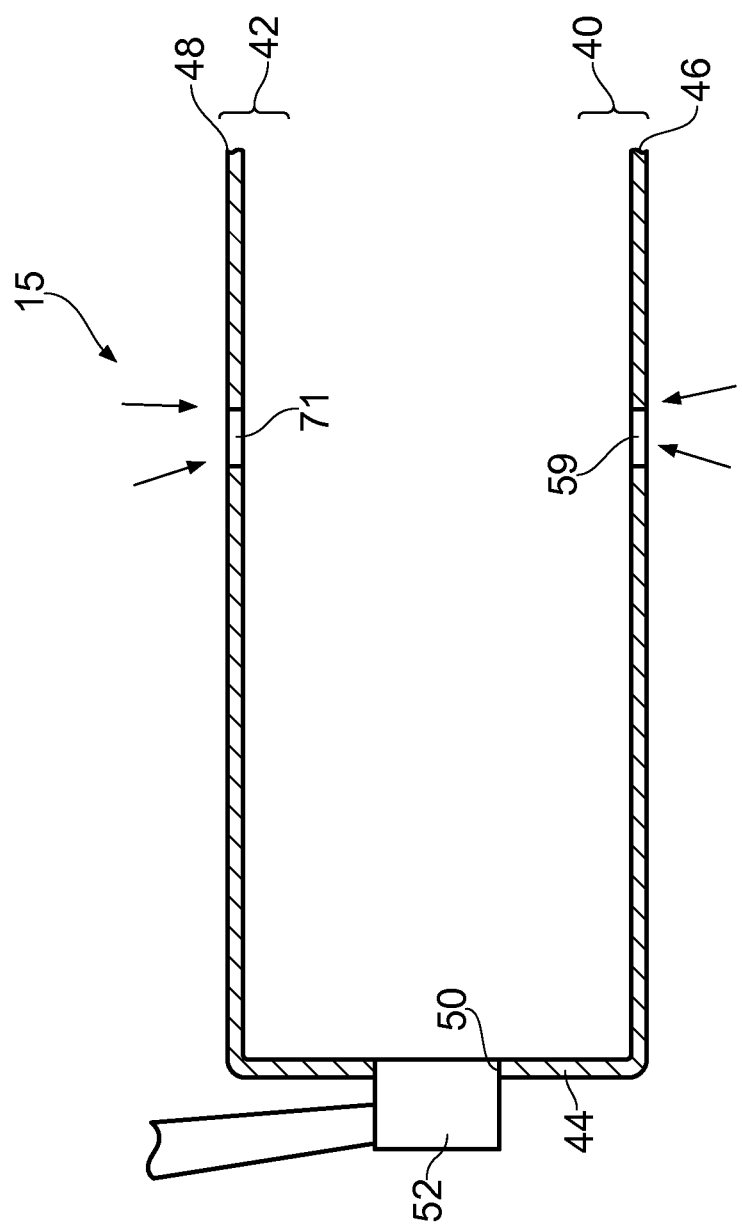
FIG. 2 is an enlarged cross-sectional view of a combustion chamber having a combustion chamber wall to the present disclosure.

The combustion chamber 15, as shown more clearly in FIG. 2, is an annular combustion chamber and comprises a radially inner annular wall structure 40, a radially outer annular wall structure 42 and an upstream end wall structure 44. The radially inner annular wall structure 40 comprises a first annular wall 46. The radially outer annular wall structure 42 comprises a second annular wall 48. The upstream end of the first annular wall 46 is secured to the upstream end wall structure 44 and the upstream end of the second annular wall 48 is secured to the upstream end wall structure 44. The upstream end wall structure 44 has a plurality of circumferentially spaced apertures 50 and each aperture 50 has a respective one of a plurality of fuel injectors 52 located therein. The fuel injectors 52 are arranged to supply fuel into the annular combustion chamber 15 during operation of the gas turbine engine 10. If the combustion chamber 15 is a rich burn combustion chamber, the first annular wall 46 has one or more dilution apertures 59 to supply dilution air into the annular combustion chamber 15 and the second annular wall 48 has one or more dilution apertures 71 to supply dilution air into the annular combustion chamber 15. If the combustion chamber 15 is a lean burn combustion chamber the first annular wall 46 and the second annular wall 48 do not have dilution apertures.

The first annular wall 46 is shown more clearly in FIGS. 3 and 4. The first annular wall 46 of the combustion chamber 15 is hollow and has a first surface 54 and a second surface 56. The first annular wall 46 comprises a plurality of polyhedron shaped chambers 58 defined by a matrix 60 of integral interconnected walls 62 and thus the first annular wall 46 comprises a single, monolithic or unitary, piece. The polyhedron shaped chambers 58 are arranged in three layers A, B and C between the first surface 54 and the second surface 56 of the first annular wall 46. The walls 62A of the polyhedron shaped chambers 58A in the first layer A define the first surface 54 of the first annular wall 46 of the combustion chamber 15, the walls 62B of the polyhedron shaped chambers 58C in the third layer C define the second surface 56 of the first annular wall 46 of the combustion chamber 15. Adjacent polyhedron shaped chambers 58 share a common wall. The polyhedron shaped chambers 58A, 58B and 58C in each layer A, B and C are interconnected to the polyhedron shaped chambers 58A, 58B and 58C in each adjacent layer A, B and C by apertures extending through the walls of the polyhedron shaped chambers 58 for the flow of coolant D there-between.

The walls of the polyhedron shaped chambers 58A in the first layer A have apertures 64A extending there-through to supply coolant D into the polyhedron shaped chambers 58A in the first layer A. The walls of the polyhedron shaped chambers 58A in the first layer A have apertures 64B extending there-through to supply coolant D into the polyhedron shaped chambers 58B in the second layer B. The walls of the polyhedron shaped chambers 58B in the second layer B have apertures 64C extending there-through to supply coolant D into the polyhedron shaped chambers 58C in the third layer C and the walls of the polyhedron shaped chambers 58C in the third layer C have apertures 64D extending there-through to supply coolant D from the polyhedron shaped chambers 58C in the third layer C into the combustion chamber 15. The apertures 64A are preferably arranged in the walls of the polyhedron shaped chambers 58A facing in an upstream direction, as shown in FIGS. 3 and 4, to enable a controlled flow of coolant D into the first layer A of chambers 58A. However, the apertures 64A may be arranged in the walls of the polyhedron shaped chambers 58A facing in a downstream direction. The apertures 64B are preferably arranged in the walls of the polyhedron shaped chambers 58A facing in a downstream direction, as shown in FIGS. 3 and 4, to enable a controlled flow of coolant D from the chambers 58A of first layer A into the chambers 58B in the second layer B. However, the apertures 64B may be arranged in the walls of the polyhedron shaped chambers 58A facing in an upstream direction. The apertures 64C are preferably arranged in the walls of the polyhedron shaped chambers 58B facing in an upstream direction and in the walls of the polyhedron shaped chambers 58B facing in a downstream direction, as shown in FIGS. 3 and 4, to enable a controlled flow of coolant D from the chambers 58B in the second layer B into the chambers 58C in the third layer C. However, the apertures 64C may be arranged only in the walls of the polyhedron shaped chambers 58B facing in a downstream direction or only in the walls of the polyhedron shaped chambers 58B facing in an upstream direction. The apertures 64D are arranged in the walls of the polyhedron shaped chambers 58C facing in a downstream direction, as shown in FIGS. 3 and 4, to enable a controlled flow of coolant D onto the second surface 56 of the first annular wall 46 to form a film of coolant D on the second surface 56 of the first annular wall 46. The controlled flow of coolant D may be a turbulent flow of coolant to enhance heat transfer.

The first surface 54 of the first annular wall 46 is multi-faceted, as shown in FIGS. 3 and 4, and the facets are defined by the walls of the polyhedron shaped chambers 58A in the first layer A. Some of the facets defined by the walls of the polyhedron shaped chambers 58A in the first layer A face in an upstream direction and some of the facets defined by the walls of the polyhedron shaped chamber 58A in the first layer A face in a downstream direction. The facets defined by the walls of the polyhedron shaped chambers 58A facing in an upstream direction have the apertures 64A extending there-through to supply coolant D into the polyhedron shaped chambers 58A in the first layer A.

The apertures 64A in the facets, or walls, of the polyhedron shaped chambers 58A facing in an upstream direction may have the same cross-sectional area as the facets of the polyhedron shaped chambers 58A such that the facets, or walls, of the polyhedron shaped chambers 58A facing in a downstream direction form scoops to supply coolant D into the polyhedron shaped chambers 58A in the first layer A. The scoops provide a total pressure feed of coolant into the first annular wall 46.

The second surface 56 of the first annular wall 46 is cylindrical, as shown in FIGS. 3 and 4, and the facets, or walls, of the polyhedron shaped chambers 58C facing in a downstream direction defining the second surface 56 have the apertures 64D extending there-through to supply coolant D from the third layer C in a downstream direction into the combustion chamber 15. The apertures 64D are arranged to minimise the exit velocity of the coolant D and reduce mixing between the hot gases in the combustion chamber 15 and the coolant D. The apertures 64D may be angled in a downstream direction and the apertures 64D may be circular in cross-section with an axially slotted exit or the apertures 64D may have a fan shaped exit and the fan shaped exit diverges in a direction perpendicular to the downstream direction.

The flow of coolant D through the first annular wall 46 is shown more clearly in FIG. 4. In particular the coolant D flows through an aperture 64A in the wall 62A of each polyhedron shaped chamber 58A and into a respective polyhedron shaped chamber 58A. It is to be noted that the coolant D is then supplied from circumferentially alternate ones of the polyhedron shaped chamber 58A of the first layer A through apertures 64B into two circumferentially adjacent polyhedron shaped chambers 58B in the second layer B. Additionally it is to be noted that the polyhedron shaped chambers 58A' in the first layer A which are positioned circumferentially between the polyhedron shaped chambers 58A which supply coolant to the polyhedron shaped chambers 58B in the second layer B do not have apertures connecting these polyhedron shaped chambers 58A' to polyhedron shaped chambers 58B in the second layer B. The polyhedron shaped chambers 58A' thus reduce the weight of the first annular wall 46 but do not allow a flow of coolant. The apertures 64A in the polyhedron shaped chambers 58A' allow removal of the metal powder used during manufacture, see below. The coolant D is than supplied from each polyhedron shaped chamber 58B in the second layer B into two circumferentially adjacent polyhedron shaped chambers 58C in the third layer C through the apertures 64C. The coolant D flowing through the apertures 64C from two circumferentially adjacent polyhedron shaped chambers 58B in the second layer B into a polyhedron shaped chamber 58C in the third layer C comprises jets of coolant which collide, or impinge on each other, to enhance turbulence and heat transfer within the polyhedron shaped chambers 58C in the third layer C. Additionally, the polyhedron shaped chamber 58C in the third layer C may have apertures 64E interconnecting circumferentially adjacent polyhedron shaped chambers 58C to provide additional coolant jets of coolant D. The coolant D then flows out of the polyhedron shaped chamber 58C in the third layer C through the apertures 64D and over the second surface 56 of the first annular wall 46 to form a film of coolant D on the second surface 56 of the first annular wall 46. The arrangement of FIGS. 3 and 4 provides dendritic cooling of the first annular wall 46.

The walls, or facets, of the polyhedron shaped chambers 58A form the first surface 54 of the first annular wall 46 and it is to be noted that these walls, or facets, form an undulating surface in both a circumferential and an axial direction and this undulating surface increases the heat transfer from the first surface 54 of the first annular wall 46 into the coolant flowing over the first surface 54 of the first annular wall 46.

The thickness of the walls of the polyhedron shaped chambers 58A, 58B and 58C is preferably in the range of 0.2 to 2 mm, e.g. 0.5 to 1 mm, and the distance between the walls of the polyhedron shaped chambers 58A, 58B and 58C is preferably in the range of 1 to 4 mm.

In FIGS. 3 and 4 the polyhedron shaped chambers 58 are rhombic dodecahedron shaped chambers and each facet/wall of the rhombic dodecahedron has a rhombic shape and all of the polyhedron shaped chambers 58 have the same shape, the same volume, same dimensions, etc. Other polyhedron shaped chambers may be used for example parallelogram sided cuboid shaped chambers, square based pyramid shaped chambers, elongated dodecahedron shaped chambers, truncated dodecahedron shaped chambers or two types of polyhedron shaped chambers, e.g. two types of irregular polyhedron shaped chambers arranged in a Weaire-Phelan structure. In addition spherical shaped chambers or spheroidal shaped chambers may be used.

The apertures 64A may be arranged such that they are positioned at a line of intersection of two adjacent facets of the polyhedron shaped chambers 58A and thus are provided through both of the two adjacent facets. The apertures 64D may be arranged such that they are positioned at a line of intersection of two adjacent facets of the polyhedron shaped chambers 58C and thus are provided through both of the two adjacent facets.

An alternative first annular wall 146 of the radially inner annular wall structure 140 is shown more clearly in FIGS. 5 and 6. The first annular wall 146 of the combustion chamber 15 is hollow and has a first surface 154 and a second surface 156. The first annular wall 146 comprises a plurality of polyhedron shaped chambers 158 defined by a matrix 160 of integral interconnected walls 162 and thus the first annular wall 146 comprises a single, monolithic or unitary, piece. The polyhedron shaped chambers 158 are arranged in two layers E and F between the first surface 154 and the second surface 156 of the first annular wall 146. The walls 162A of the polyhedron shaped chambers 158A in the first layer E define the first surface 154 of the first annular wall 146 of the combustion chamber 15, the walls 162B of the polyhedron shaped chambers 158B in the second layer F define the second surface 156 of the first annular wall 146 of the combustion chamber 15. Adjacent polyhedron shaped chambers 158 share a common wall. The polyhedron shaped chambers 158A and 158B in each layer E and F are interconnected to the polyhedron shaped chambers 158A and 158B in each adjacent layer E and F by apertures extending through the walls of the polyhedron shaped chambers 58 for the flow of coolant D there-between. The first annular wall 146 is substantially the same as the first annular wall 46 but the first annular wall 146 only has two layers E and F of polyhedron shaped chambers 158A and 158B compared to three layers A, B and C of polyhedron shaped chambers 58A, 58B and 58C for the first annular wall 46.

The flow of coolant D through the first annular wall 146 is shown more clearly in FIG. 6. In particular the coolant D flows through an aperture 164A in the wall 162A of each polyhedron shaped chamber 158A and into a respective polyhedron shaped chamber 158A. It is to be noted that the coolant D is then supplied from circumferentially alternate ones of the polyhedron shaped chamber 158A of the first layer E through apertures 164B into two circumferentially adjacent polyhedron shaped chambers 158B in the second layer F. Additionally it is to be noted that the polyhedron shaped chambers 158A' in the first layer E which are positioned circumferentially between the polyhedron shaped chambers 158A which supply coolant to the polyhedron shaped chambers 158B in the second layer F do not have apertures connecting these polyhedron shaped chambers 158A' to polyhedron shaped chambers 158B in the second layer F. The polyhedron shaped chambers 158A' thus reduce the weight of the first annular wall 146 but do not allow a flow of coolant. The apertures 164A in the polyhedron shaped chambers 158A' allow removal of the metal powder used during manufacture, see below. The coolant D then flows out of the polyhedron shaped chamber 158B in the second layer C through the apertures 164C and over the second surface 156 of the first annular wall 146 to form a film of coolant D on the second surface 156 of the first annular wall 146. The apertures 164C are arranged to minimise the exit velocity of the coolant D and reduce mixing between the hot gases in the combustion chamber 15 and the coolant D. The apertures 164C may be angled in a downstream direction and the apertures 164C may be circular in cross-section with an axially slotted exit or the apertures 164C may have a fan shaped exit and the fan shaped exit diverges in a direction perpendicular to the downstream direction. The arrangement of FIGS. 5 and 6 provides dendritic cooling of the first annular wall 146.

In FIGS. 5 and 6 the polyhedron shaped chambers 158 are rhombic dodecahedron shaped chambers and each facet/wall of the rhombic dodecahedron has a rhombic shape and all of the polyhedron shaped chambers 158 have the same shape, the same volume, same dimensions, etc. Other polyhedron shaped chambers may be used for example parallelogram sided cuboid shaped chambers, square based pyramid shaped chambers, elongated dodecahedron shaped chambers, truncated dodecahedron shaped chambers or two types of polyhedron shaped chambers, e.g. two types of irregular polyhedron shaped chambers arranged in a Weaire-Phelan structure. In addition spherical shaped chambers or spheroidal shaped chambers may be used.

The apertures 164A may be arranged such that they are positioned at a line of intersection of two adjacent facets of the polyhedron shaped chambers 158A and thus are provided through both of the two adjacent facets. The apertures 164B may be arranged such that they are positioned at a line of intersection of two adjacent facets of the polyhedron shaped chambers 158B and thus are provided through both of the two adjacent facets.

Another first annular wall 246 of the radially inner annular wall structure 240 is shown more clearly in FIG. 7. The first annular wall 246 of the combustion chamber 15 is hollow and has a first surface 254 and a second surface 256. The first annular wall 246 comprises a plurality of polyhedron shaped chambers 258 defined by a matrix 260 of integral interconnected walls 262 and thus the first annular wall 246 comprises a single, monolithic or unitary, piece. The polyhedron shaped chambers 258 are arranged in four layers G, H, I and J between the first surface 254 and the second surface 256 of the first annular wall 246. The walls 262A of the polyhedron shaped chambers 258A in the first layer E define the first surface 154 of the first annular wall 146 of the combustion chamber 15, the walls 262B of the polyhedron shaped chambers 258D in the fourth layer F define the second surface 256 of the first annular wall 246 of the combustion chamber 15. Adjacent polyhedron shaped chambers 258 share a common wall. The polyhedron shaped chambers 258A, 258B, 258C and 258D in each layer G, H, I and J are interconnected to the polyhedron shaped chambers 258A, 258B, 258C and 258D in each adjacent layer G, H, I and J by apertures extending through the walls of the polyhedron shaped chambers 158 for the flow of coolant D there-between. The first annular wall 246 is substantially the same as the same as the first annular wall 46 but the first annular wall 246 has four layers G, H, I and J of polyhedron shaped chambers 258A, 258B, 258C and 258D compared to three layers A, B and C of polyhedron shaped chambers 58A, 58B and 58C for the first annular wall 46.

In FIG. 7 the polyhedron shaped chambers 258 are rhombic dodecahedron shaped chambers and each facet/wall of the rhombic dodecahedron has a rhombic shape and all of the polyhedron shaped chambers 258 have the same shape, the same volume, same dimensions, etc. Other polyhedron shaped chambers may be used for example parallelogram sided cuboid shaped chambers, square based pyramid shaped chambers, elongated dodecahedron shaped chambers, truncated dodecahedron shaped chambers or two types of polyhedron shaped chambers, e.g. two types of irregular polyhedron shaped chambers arranged in a Weaire-Phelan structure. In addition spherical shaped chambers or spheroidal shaped chambers may be used.

The first surface 254 of the first annular wall 246 is multi-faceted, as shown in FIG. 7, and the facets are defined by the walls of the polyhedron shaped chambers 258A in the first layer G. Some of the facets defined by the walls of the polyhedron shaped chambers 258A in the first layer G face in an upstream direction and some of the facets defined by the walls of the polyhedron shaped chamber 258A in the first layer G face in a downstream direction. The facets defined by the walls of the polyhedron shaped chambers 258A facing in an upstream direction have the apertures 264A extending there-through to supply coolant D into the polyhedron shaped chambers 258A in the first layer G. The apertures 264A in the facets, or walls, of the polyhedron shaped chambers 258A facing in an upstream direction have the same cross-sectional area as the facets of the polyhedron shaped chambers 258A such that the facets, or walls, of the polyhedron shaped chambers 258A facing in a downstream direction form scoops to supply coolant D into the polyhedron shaped chambers 258A in the first layer A. The scoops provide a total pressure feed of coolant into the first annular wall 246. However, the apertures 264A in the facets facing in an upstream direction may have a smaller cross-sectional area than the facets of the polyhedrons shaped chambers 258A. The apertures 264D in the facets, or walls, of the polyhedron shaped chambers 258D facing in a downstream direction have the same cross-sectional area as the facets of the polyhedron shaped chambers 258D such that the facets, or walls, of the polyhedron shaped chambers 258D facing in a downstream direction form outlets to supply coolant D from the polyhedron shaped chambers 258D in the fourth layer D over the second surface 256 of the first annular wall 246. However, the apertures 264D in the facets facing in a downstream direction may have a smaller cross-sectional area than the facets of the polyhedrons shaped chambers 258D. The apertures 264D may be arranged to minimise the exit velocity of the coolant D and reduce mixing between the hot gases in the combustion chamber 15 and the coolant D. The apertures 264D may be angled in a downstream direction and the apertures 264D may be circular in cross-section with an axially slotted exit or the apertures 264D may have a fan shaped exit and the fan shaped exit diverges in a direction perpendicular to the downstream direction.

The apertures 264A may be arranged such that they are positioned at a line of intersection of two adjacent facets of the polyhedron shaped chambers 258A and thus are provided through both of the two adjacent facets. The apertures 264D may be arranged such that they are positioned at a line of intersection of two adjacent facets of the polyhedron shaped chambers 258D and thus are provided through both of the two adjacent facets.

The flow of coolant D through the first annular wall 246 may be similar to that shown with respect FIGS. 5 and 6.

Another possible flow of coolant D through the first annular wall 246 is shown in FIG. 7. The flow of coolant D through the first annular wall 246 follows a tortuous flow path in which the coolant D flows from a polyhedron shaped chamber 258A in the first layer G through intervening polyhedron shaped chamber 258B, 258C in the second and third layers H, I to a polyhedron shaped chamber 258D in the fourth layer J. The coolant D then flows from the polyhedron shaped chamber 258D in the fourth layer J circumferentially to an adjacent polyhedron shaped chamber 258D and then through intervening polyhedron shaped chamber 258C, 258B in the third and second layers I, H to a polyhedron shaped chamber 258A in the first layer G. The coolant D then flows from the polyhedron shaped chamber 258A in the first layer G circumferentially to an adjacent polyhedron shaped chamber 258A and then through intervening polyhedron shaped chamber 258B, 258C in the second and third layers H, I to a polyhedron shaped chamber 258D in the fourth layer J and then out of that polyhedron shaped chamber 258D in the fourth layer J and over the surface 256 of the first annular wall 246

Features described with reference to FIGS. 3 and 4 may be used in FIGS. 5 and 6 or FIG. 7, features described with reference to FIGS. 5 and 6 may be used in FIGS. 3 and 4 or FIG. 7 and features described with reference to FIG. 7 may be used in FIGS. 3 and 4 or FIGS. 5 and 6.

The first and/or second annular wall may comprise two, three, four or more layers of polyhedron shaped chambers.

The first surface of the first and/or second annular wall may be cylindrical.

Figure 19:
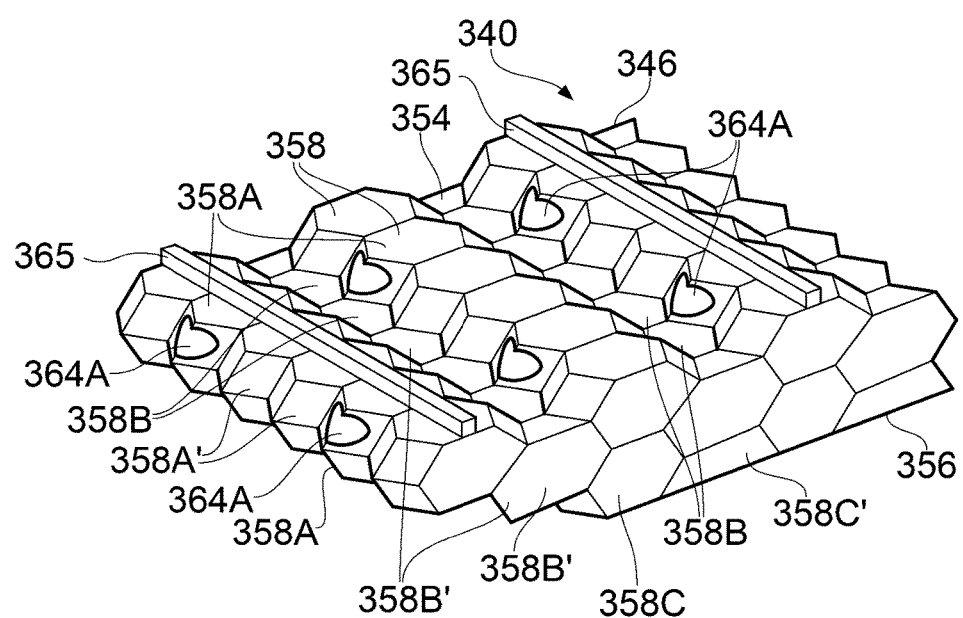
FIG. 19 is an enlarged perspective view of an outer surface of a portion of the combustion chamber wall shown in FIG. 17.

As shown in FIGS. 17-19, the first surface of the first and/or second annular wall may have at least one rib 65/365 extending there-from in a direction away from the second surface, e.g. radially away from the first surface of the first or second annular wall, to increase heat transfer from the first surface of the first and/or second annular wall to the coolant flowing over the first surface. The at least one rib 65/365 may extend in a circumferential direction or in an axial direction. The at least one rib 65/365 may extend in the direction of build by the manufacturing process, e.g. DLD build direction.

The first surface of the first and/or second annular wall may be corrugated.

The apertures in the facets facing in an upstream direction may have the same cross-sectional area as the facets such that the facets facing in a downstream direction form scoops to supply coolant into the first layer.

The apertures in the downstream walls of the polyhedron shaped chambers defining the second surface may have the same cross-sectional area as the downstream walls of the polyhedron shaped chambers.

At least one of the polyhedron shaped chambers may have one or more ribs extending from at least one of the walls of the at least one of the polyhedron shaped chambers into the respective polyhedron shaped chamber to increase heat transfer from the at least one of the walls of the polyhedron shaped chamber to the coolant flowing through the polyhedron shaped chamber.

A plurality of the polyhedron shaped chambers may have one or more ribs extending from at least one of the walls of the polyhedron shaped chambers into the respective polyhedron shaped chambers to increase heat transfer from the at least one of the walls of the polyhedron shaped chambers to the coolant flowing through the polyhedron shaped chambers.

The at least one rib extending from the at least one of the walls of the at least one of the polyhedron shaped chambers extends axially of the first and/or second annular wall. The at least one rib may extend in the direction of build by the manufacturing process, e.g. DLD build direction.

The combustion chamber wall may be formed from a nickel base superalloy, a cobalt base superalloy or an iron base superalloy.

A thermal barrier coating may be provided on the second surface of the combustion chamber wall. The thermal barrier coating may comprise a ceramic material. The ceramic material may comprise zirconia or stabilised zirconia. The thermal barrier coating may be provided on the second surface of the combustion chamber wall by plasma spraying, physical vapour deposition, e.g. electron beam physical vapour deposition, or chemical vapour deposition. A bond coating may be provided on the second surface of the combustion chamber wall before the thermal barrier coating. The bond coating may comprise a MCrAlY coating, where M is one or more of nickel, cobalt and iron, or an aluminide coating, e.g. a simple aluminide, a chromium aluminide, a platinum aluminide, platinum chromium aluminide or a silicide aluminide.

The axial ends of the first and/or second annular wall 46, 48 are solid and there is a transition from the polyhedron shaped chambers to the solid ends. The axial ends, the upstream and downstream ends, of the first and/or second annular wall 46, 48 are joined to the upstream end wall structure 44 and to a nozzle guide vane structure (not shown). The axial ends of the first and/or second annular wall 46, 48 may be provided with a tongue or a groove to locate in or on a groove or a tongue of the upstream end wall structure 42 and the nozzle guide vane structure and then the axial ends may be welded, brazed or bonded to the upstream end wall structure 42 and the nozzle guide vane structure. The axial ends of the first and/or second walls 46, 48 may be joined to the upstream end wall structure 42 and the nozzle guide vane structure by other suitable joints. The tongue and groove arrangements form seals to minimise leakage of hot gases from the combustion chamber 15 and also controls the flow of coolant into the combustion chamber 15.

The first annular wall 46 and/or second annular wall 48 of the combustion chamber 15 is manufactured by an additive manufacturing process, for example selective laser melting, direct laser deposition, powder bed fusion, shaped metal deposition. Powder bed fusion uses a laser beam or an electron beam to melt and fuse powder particles together to build up an article layer by layer from powder material, e.g. powder metal, by moving the laser beam, or electron beam, in a predetermined pattern, or path, across sequentially deposited layers of powder material. Shaped metal deposition uses a welding torch, a laser beam or an electron beam torch to melt and fuse material together to build up an article layer by layer from powder material, e.g. powder metal, or welding rod, metal rod by moving the torch, laser beam or electron beam in a predetermined pattern, or path, and supplying the powder material or welding rod into the path. The first annular wall 46 and/or the second annular wall 48 may be manufactured by any suitable additive layer manufacturing technique.

Figure 8:
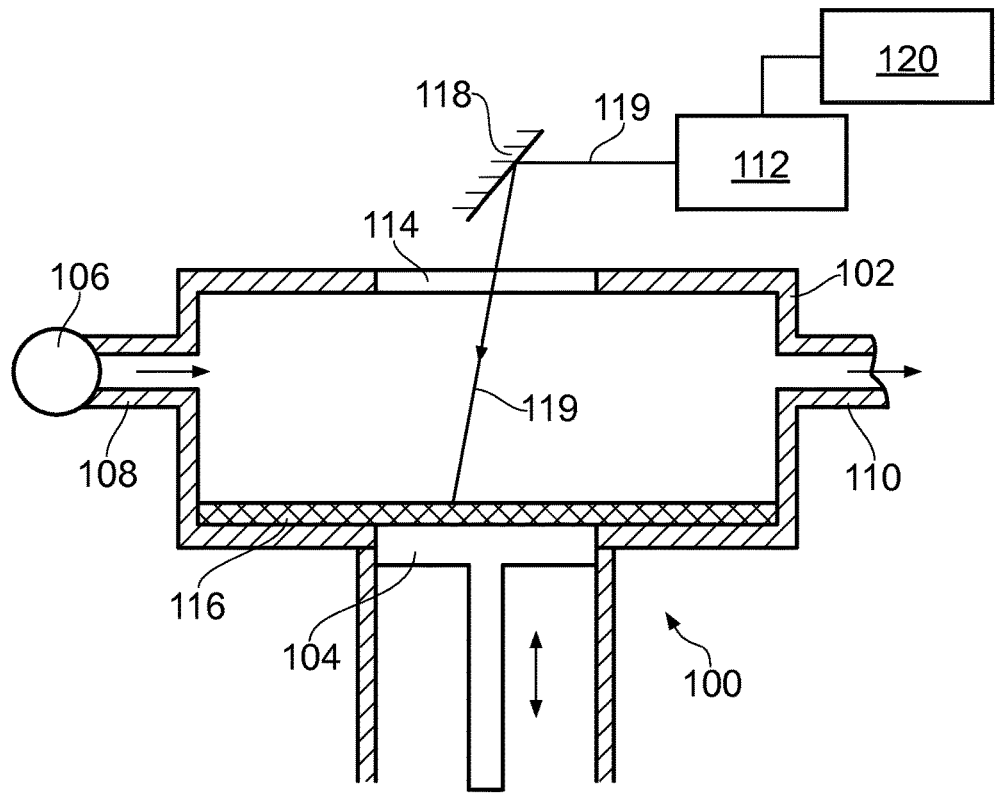
FIG. 8 is an apparatus for manufacturing a combustion chamber wall according to the present disclosure.

The first annular wall 46 and/or second annular wall 48 of the combustion chamber 15 is manufactured for example using selective laser melting or powder bed fusion using an apparatus shown in FIG. 8. The apparatus 100 comprises a sealed chamber 102, which has a retractable platform 104. A pump 106 is provided to supply an inert gas, argon or nitrogen, through a pipe 108 into the chamber 102 and gas is extracted from the chamber 102 via a pipe 110. A laser 112, e.g. an infrared laser, is provided to direct a laser beam 119 through a window 114 in the chamber 102. A controller 120 has a CAD definition of the shape and features of the first annular wall 46 and/or second annular wall 48 of the combustion chamber 15 and the laser 112 is moved under the control of the controller 120. In this case the controller 120 has a CAD definition of the shape and features of the radially inner annular wall structure 40 and/or the radially outer annular wall structure 42 of the combustion chamber 15 and the laser 112 is moved under the control of the controller 120. The radially inner annular wall structure 40 is a unitary structure comprising the first annular wall 46 and the radially outer wall structure 42 is a unitary structure comprising the second annular wall 48. The first annular wall 46 is hollow and comprises a first surface 54 and a second surface 56 and the first annular wall 46 comprises a plurality of polyhedron shaped chambers 58 defined by a matrix of integral interconnected walls 62 and the polyhedron shaped chambers 58 are arranged in at least two layers between the first surface 54 and the second surface 56. The second annular wall 48 is hollow and comprises a first surface and a second surface and the second annular wall 48 comprises a plurality of polyhedron shaped chambers defined by a matrix of integral interconnected walls and the polyhedron shaped chambers are arranged in at least two layers between the first surface and the second surface.

The first annular wall 46 and/or second annular wall 48 is manufactured by placing a first layer 116 of a suitable metal, or alloy, powder, on the retractable platform 104 in the sealed chamber 102. The laser beam 119 is scanned across the layer of metal powder 116 in a predetermined pattern to form a first layer of the first annular wall 46 and/or second annular wall 48 by bodily moving the laser 112 appropriate distances in perpendicular X and Y directions or by deflecting the laser beam 119 off a movable mirror 118. The laser beam 119 melts and fuses or sinters the metal powder where it strikes the layer of metal powder 116. Then a second, thin, layer of metal, or alloy, is placed on the first layer, the platform 104 is retracted one increment outwards from the chamber 102 and the laser beam 119 is scanned across the layer of metal powder in a further predetermined pattern to form a second layer of the first annular wall 46 and/or third annular wall 48 respectively. The laser beam 119 melts and fuses or sinters the metal powder where it strikes the second layer of metal powder 116 and bonds, fuses or sinters the second layer of the first annular wall 46 and/or second annular wall 48 to the first layer of the first annular wall 46 and/or second annular wall 48 respectively. The process of placing layers of metal powder, retracting the platform 104 and scanning the laser beam 119 across the layer of metal powder in a predetermined pattern to fuse and sinter the metal powder in each layer and to bond each layer to the previously deposited layer is repeated a sufficient number of times to build the first annular wall 46 and/or second annular wall 48 layer by layer from one axial end to the opposite axial end. The predetermined pattern of scanning of the laser beam 119 for each layer is determined by the CAD model of the first annular wall 46 and/or second annular wall 48.

Figure 9:
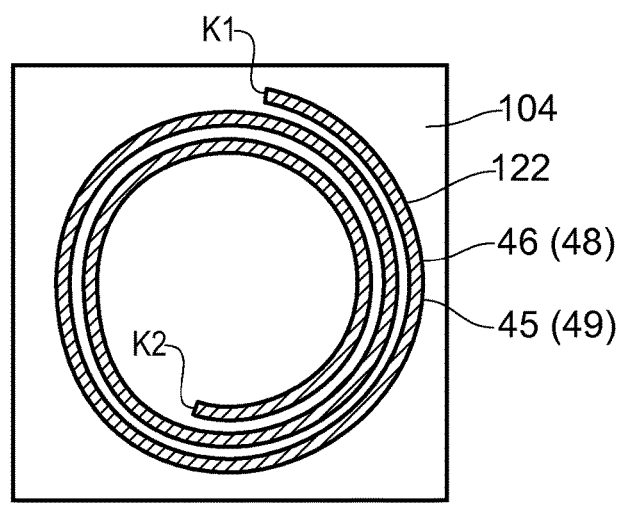
FIG. 9 is a plan view of the wall of the combustion chamber shown in FIG. 2 during the manufacturing process and within the apparatus of FIG. 6.

It is to be noted that the first annular wall 46 and/or second annular wall 48 of the combustion chamber 15 is an annular wall, but the present disclosure manufactures the first annular wall 46 and/or second annular wall 48 by moving the laser beam 119 in a predetermined spiral pathway 122, as shown in FIG. 9, and thus the metal powder in each layer is melted and fused or sintered to form a spiral to produce each layer of a first spiral wall 45 and/or a second spiral wall 49.

Initially a number of the layers of the first spiral wall 45 and/or the second spiral wall 49 are solid to define an axial end of the first annular wall 46 and/or second annular wall 48. Then some of the subsequent layers of the first spiral wall 45 and/or second spiral wall 49 have one or more regions where the metal powder in that particular layer of the spiral 122 is not melted and fused or sintered. The regions of the subsequent layers where the metal powder is melted and fused or sintered defines the matrix of interconnected walls 62 and in particular defines or forms the walls of the polyhedron shaped chambers 58. The regions of the subsequent layers of the first spiral wall 46 and/or the second spiral wall 49 where the metal powder is not melted and fused or sintered are primarily the polyhedron shaped chambers 58. Other regions of the subsequent layers of the first spiral wall 46 and/or second spiral wall 49 where the metal powder is not melted and fused or sintered form apertures 64 through the first spiral wall 49 and/or second spiral wall 49. Some of these apertures 64 are apertures 64A in the first surface 54 of the first annular wall 46 and/or second annular wall 48 to provide coolant into the polyhedron shaped chambers 58A in the first layer A in the first annular wall 46 and/or second annular wall 48 respectively. Some of these apertures 64 are apertures 64D in the second surface 56 of the first annular wall 46 and/or second annular wall 48 to enable coolant to flow out of the polyhedron shaped chambers 58C in the third layer C in the first annular wall 46 and/or second annular wall 48 respectively and onto the second surface 56 of the first annular wall 46 and/or second annular wall 48. The remainder of the apertures 64 are apertures 64B and 64C extending between the polyhedron shaped chambers 58 in the layers A, B and C of the first annular wall 46 and/or second annular wall 48. Some of these apertures may be dilution apertures 59 or 71 for the first annular wall 46 and second annular wall 48, which extend completely through the first annular wall 46 and the second annular wall 48, respectively to provide dilution air into the annular combustion chamber 15. Finally a number of the layers of the first spiral wall 45 and/or second spiral wall 49 are solid to define an opposite axial end of the first annular wall 46 and/or second annular wall 48. Thus, the first spiral wall 45 and/or second spiral wall 49 is built up layer by layer by melting and fusing or sintering the metal powder. It is necessary to remove the un-fused, or un-sintered, metal powder from the first spiral wall 45 and/or second spiral wall 49 and this may be by inverting the first spiral wall 45 and/or second spiral wall 49 to pour out the un-fused metal powder. This removal of the un-fused metal powder may be assisted by vibration, air blast etc. The un-fused, or un-sintered, metal powder is removed in particular from the regions forming the polyhedron shaped chambers 58 and the apertures 64, 59 and 71 in the first spiral wall 45 and/or second spiral wall 49.

Figure 10:
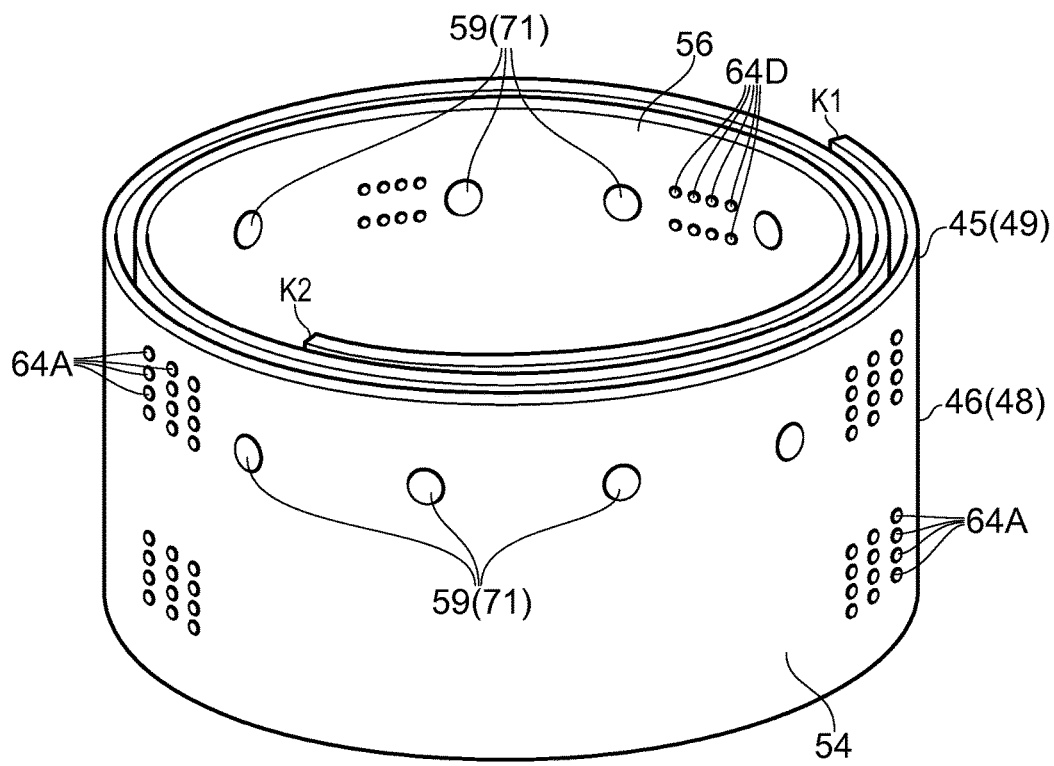
FIG. 10 is a perspective view of the wall of the combustion chamber shown in FIG. 2 during the manufacturing process.
Figure 11:
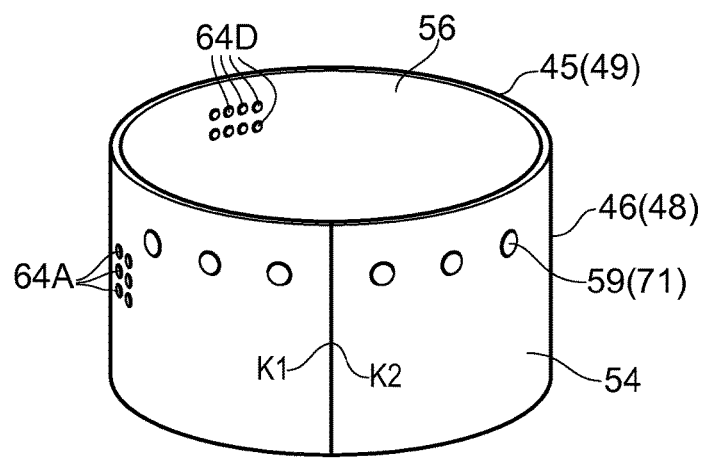
FIG. 11 is a perspective view of the wall of the combustion chamber shown in FIG. 2 at the end of the manufacturing process.

The completed first spiral wall 45 and/or the second spiral wall 49, as shown in FIG. 10, is then removed from the apparatus 100. The completed first spiral wall 45 and/or the second spiral wall 49 is then rolled out to form a ring, e.g. a spilt ring, and the ends K1 and K2 of what was the first spiral wall 45 or second spiral wall 49 are abutted and joined together in an end K1 to end K2 manner as shown in FIG. 11 to form the first annular wall 46 and/or the second annular wall 48. The ends K1 and K2 of the first spiral wall 45 or second spiral wall 49 are joined together by welding, bonding, brazing, bolting or other suitable joining techniques to form the first annular wall 46 and/or the second annular wall 48. The ends K1 and K2 of the first spiral wall 45 or second spiral wall 49 may be solid metal and the ends K1 and K2 of the first spiral wall 45 or second spiral wall 49 may be provided with a tongue or a groove at the end K1 to locate in or on a groove or a tongue of the opposite end K2 of the first spiral wall 45 or second spiral wall 49, as shown in FIG. 12. The tongue and groove arrangements form seals to minimise leakage of hot gases from the combustion chamber. The ends K1 and K2 of the first spiral wall 45 or second spiral wall 49 may be welded, brazed or bonded to the opposite end of the first spiral wall 45 or second spiral wall 49. The ends K1 and K2 of the first spiral wall 45 or second spiral wall 49 may be joined together by other suitable joints.

Alternatively the ends K1 and K2 of the first spiral wall 45 or second spiral wall 49 may have layers of polyhedron shaped chambers 58 and the ends K1 and K2 of the first spiral wall 45 or second spiral wall 49 may be provided with a tongue or a groove at the end K2 to locate in or on a groove or a tongue at the opposite end K1 of the first and/or second spiral wall 45, 49 as shown in FIG. 13. The tongue and groove arrangements form seals to minimise leakage of hot gases from the combustion chamber. The polyhedron shaped chambers 58 in the layers at the ends K1 and K2 are arranged to align with the polyhedron shaped chambers 58 in the layers at the opposite end K1 and K2 of the first spiral wall 45 or second spiral wall 49 to maintain the porosity of the first and/or second annular wall 46, 48 and to allow the coolant to flow through the first and/or second annular wall 46, 48 at the joint between the, or each pair of adjacent segments. The ends K1 and K2 are joined by fasteners, e.g. nuts and bolts extending through flanges provided on the ends K1 and K2, by welding or by brazing.

As an example a standard powder bed fusing apparatus has base dimensions of 250 mm by 250 mm and the first and second annular walls 46 and 48 of the annular combustion chamber 15 have diameters much greater than 250 mm for example 1m.

The first annular wall 46 and the second annular wall 48 have an inner diameter and an outer diameter. The first annular wall 46 and the second annular wall 48 in this example are tubular and the inner diameter of both of the annular walls 46 and 48 is substantially constant along the length of the annular walls 46 and 48, except for flanges, bosses etc, and the outer diameter of both of the annular walls 46 and 48 is substantially constant along the length of the annular walls 46 and 48, except for flanges, bosses etc. Alternatively the annular walls 46 and 48 may be frusto-conical and the inner diameter of both of the annular walls 46 and 48 increases from a first end of the annular wall 46 and 48 to a second end of the annular wall 46 and 48 and the outer diameter of both of the annular walls 46 and 48 increases from the first end of the annular wall 46 and 48 to the second end of the annular wall 46 and 48. The inner diameter and the outer diameter of the annular wall 46 and 48 may increase gradually from the first end to the second end of the annular wall 46 and 48, except for flanges, bosses etc. The inner diameter and the outer diameter of the annular wall 46 and 48 may increase constantly, or in a stepped manner, from the first end to the second end of the annular wall 46 and 48. It may be possible that the first annular wall 46 is tubular and the second annular wall 48 is frusto-conical or visa-versa.

The manufacturing process for a tubular wall involves moving the laser beam along a plurality of spiral pathways, one for each layer of powder metal, and that all the spiral pathways have the same shape and the same length. The manufacturing process for a frustoconical wall is substantially the same as that for a tubular wall except the spiral pathway along which the laser beam is moved is different for each layer of powder metal and in particular the spiral pathway has a different length for each layer of powder metal and so that the spiral pathways progressively increase or decrease in length as the layers of powder metal are deposited.

An advantage of the manufacturing process of the present disclosure is that it enables the manufacture of a large diameter first annular wall 46 and/or second annular wall 48 within the confines of a powder bed fusion apparatus which has dimensions less than the diameter of the first annular wall 46 and/or second annular wall 48. A further advantage of the manufacturing process of the present disclosure is that it eliminates the need for forging and turning of a metal billet to produce the first annular wall 46 and/or second annular wall 48 and eliminates the need to drill by machining, electrochemical machining, electro discharge machining, laser machining etc the dilution apertures, cooling apertures and mounting apertures through either or both of these annular walls. It eliminates the need for casting large numbers of tiles and the need to drill by machining, electrochemical machining, electro discharge machining or laser machining the cooling apertures. Another advantage is that it obviates the need to assemble a number of parts.

The radially inner annular wall structure 40, e.g. the first annular wall 46, and the radially outer annular wall structure 42, e.g. the second annular wall 48, are complex hollow annular wall structures and have complex cooling arrangements.

The ribs extending from the walls of the polyhedron shaped chambers 58 and within the polyhedron shaped chambers 58 extend axially with respect to the first and/or second annular wall 46 and 48 and are produced easily as the first and/or second annular walls 46 and 48 by building them up layer by layer and thus the ribs extending from the walls of the polyhedron are arranged to extend in the direction of build of the first and/or second annular walls 46 and 48.

The first and/or second annular wall 46 and 48 are built up layer by layer in the axial direction of the first and second annular walls 46 and 48. In the cases of rhombic dodecahedron shaped chambers and elongated dodecahedron shaped chambers there are no horizontal facets, or walls, for the polyhedron shaped chambers and all the walls, or facets, of the polyhedron shaped chambers are at an angle of 45° to the horizontal plane or at an angle of 45° the direction of build. In the case of truncated dodecahedron shaped chambers there are no horizontal facets, or walls, for the polyhedron shaped chambers and the walls, or facets, of the polyhedron shaped chambers are either at an angle of 45° or 30° to the horizontal plane or at angle of 45° or 60° to the build direction. In the case of facets, or walls, of the polyhedron shaped chambers arranged at an angle of 30° to the horizontal plane or 60° to the build direction the internal surface may be arched to make the manufacturing easier.

Alternatively it may be possible to manufacture the first and/or second annular walls 46 and 48 in circumferential segments using the same apparatus as shown in FIG. 8. The segments are again built up layer by layer in an axial direction and then the segments are joined together by welding, bonding, brazing, bolting or other suitable joining techniques to form the first annular wall 46 and/or the second annular wall 48. The circumferential ends of the segments may be solid metal and the circumferential ends of the segments of the first and/or second annular wall 46, 48 may be provided with a tongue or a groove to locate in or on a groove or a tongue of an adjacent segment of the first and/or second annular wall 46, 48. The tongue and groove arrangements form seals between the circumferential ends of adjacent segments to minimise leakage of hot gases from the combustion chamber. The circumferential ends of the segments of the first and/or second walls 46, 48 may be welded, brazed or bonded to an adjacent segment of the first and/or second wall 46, 48. The circumferential ends of the segments of the first and/or second walls 46, 48 may be joined to an adjacent segment of the first and/or second wall 46, 48 by other suitable joints.

Alternatively the circumferential ends of the segments may have layers of polyhedron shaped chambers 58 and the circumferential ends of the segments of the first and/or second annular wall 46, 48 may be provided with a tongue or a groove to locate in or on a groove or a tongue of an adjacent segment of the first and/or second annular wall 46, 48. The tongue and groove arrangements form seals between the circumferential ends of adjacent segments to minimise leakage of hot gases from the combustion chamber. The polyhedron shaped chambers 58 in the layers at a circumferential end of one segment are arranged to align with the polyhedron shaped chambers 58 in the layers at the circumferential end of the adjacent segment to maintain the porosity of the first and/or second annular wall 46, 48 and to allow the coolant to flow through the first and/or second annular wall 46, 48 at the joint between the, or each pair of adjacent segments. The segments are joined by fasteners, e.g. nuts and bolts extending through flanges provided on the ends of the segments, by welding or by brazing.

The first annular wall 146 of the radially inner annular wall structure 140 and/or the first annular wall 246 of the radially inner annular wall 240 may be manufactured using the apparatus and methods described with reference to FIGS. 8 to 13.

Figure 14:
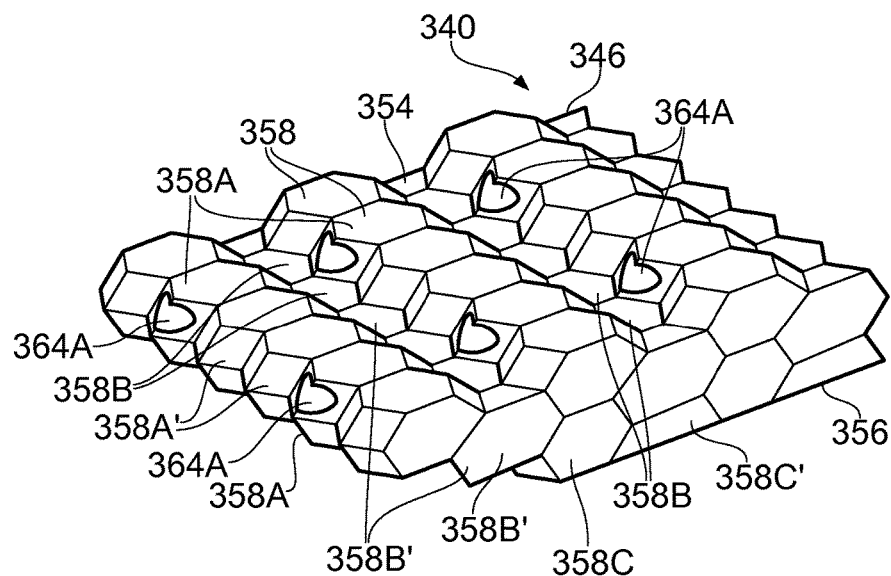
FIG. 14 is an enlarged perspective view of an outer surface of a portion of the wall of the combustion chamber shown in FIG. 2 showing a fourth combustion chamber wall according to the present disclosure.
Figure 15:
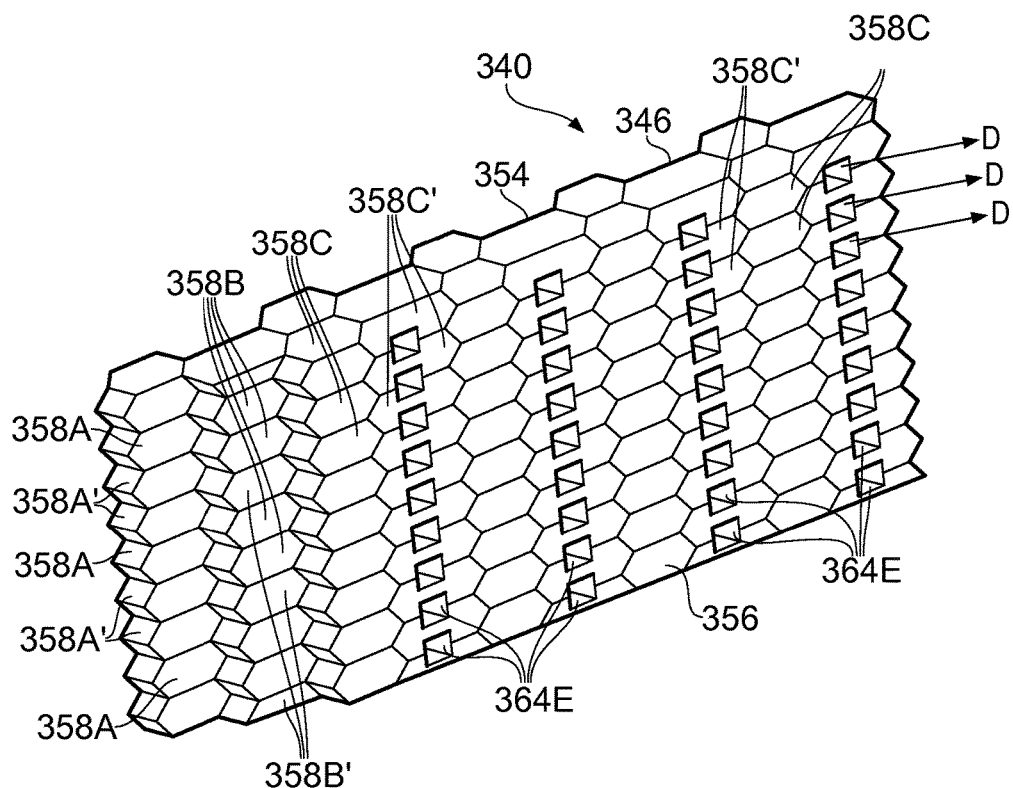
FIG. 15 is an enlarged perspective view of the inner surface of a portion of the wall of the combustion chamber shown in FIG. 2 showing the fourth combustion chamber wall according to the present disclosure.

FIGS. 14 and 15 show a further first annular wall 346 of the radially inner annular wall structure 340. The first annular wall 346 comprises a plurality of polyhedron shaped chambers 358 defined by a matrix 360 of integral interconnected walls 362 and thus the first annular wall 346 comprises a single, monolithic or unitary, piece. The first annular wall 346 of a combustion chamber wall comprises elongated dodecahedron shaped chambers 358 in which the dodecahedrons are elongated in an axial direction of the radially inner annular wall 340. The elongated dodecahedron shaped chambers have four hexagonal shaped facets/walls and eight rhombic facets/walls. The first annular wall 346 of the combustion chamber wall also comprises some polyhedron shaped chambers 358D which are half of an elongated dodecahedron shaped chamber 358. In the first annular wall 346 of the radially inner annular wall 340 every third polyhedron shaped chamber 358A in the first layer has an aperture 364A for the supply of coolant and the polyhedron shaped chambers 358A' in the first layer are not supplied with coolant. Each polyhedron shaped chamber 358A in the first layer has apertures to supply coolant into two circumferentially adjacent polyhedron shaped chambers 358B in the second layer and every third polyhedron shaped chambers 358B' in the second layer is not supplied with coolant. Each polyhedron shaped chamber 358B in the second layer has apertures to supply coolant into two circumferentially adjacent polyhedron shaped chambers 358C in the third layer and each polyhedron shaped chamber 358C in the third layer has apertures to supply coolant into a respective half polyhedron shaped chamber 358C' in the third layer. Each half polyhedron shaped chamber 358C' in the third layer has one or more apertures 364E to supply the coolant over the inner surface 356 of the radially inner annular wall 340. It is to be noted that the polyhedron shaped chambers 358C are arranged in rows of circumferentially adjacent polyhedron shaped chambers 358C and the half polyhedron shaped chambers 358C' are arranged in rows of circumferentially adjacent half polyhedron shaped chambers 358C'. The rows of circumferentially adjacent polyhedron shaped chambers 358C are arranged axially alternately with rows of circumferentially adjacent half polyhedron shaped chambers 358C'. It is to be noted that the polyhedron shaped chambers 358A and 358A' are arranged in rows of circumferentially adjacent polyhedron shaped chambers 358A, 358A' and each row of circumferentially adjacent polyhedron shaped chambers 358A, 358A' is arranged radially adjacent a corresponding row of circumferentially adjacent polyhedron shaped chambers 358C. It is to be noted that the polyhedron shaped chambers 358B and 358B' are arranged in rows of circumferentially adjacent polyhedron shaped chambers 358B, 358B' and each row of circumferentially adjacent polyhedron shaped chambers 358B, 358B' is arranged radially adjacent a corresponding row of circumferentially adjacent half polyhedron shaped chambers 358C'. The particular arrangement shows that each aperture 364E overlaps two circumferentially adjacent half polyhedron shaped chambers 358C' and thus each aperture 364E is supplied with coolant D from two half polyhedron shaped chamber 358C' or each half polyhedron shaped chamber 358C' has two circumferentially spaced apertures 364E. It may be possible for each half polyhedron shaped chamber 358C' to have a single aperture located circumferentially at the centre of the half polyhedron shaped chamber 358C' or at another suitable position. Each row of polyhedron shaped chambers 358A and 358A' is spaced axially from the next row of polyhedron shaped chambers 358A and 358A' and the intervening axial space provides a convoluted outer surface for the first annular wall 346 and provides enhanced heat transfer from the first annular wall 346 to the coolant flowing over the first annular wall 346. The apertures 364A provide a total pressure feed of coolant into the first annular wall 346.

The first annular wall 346 of the radially inner annular wall structure 340 may be manufactured using the apparatus and methods described with reference to FIGS. 8 to 13.

An additional first annular wall 446 is shown more clearly in FIG. 16. The first annular wall 446 of the combustion chamber 15 is hollow and has a first surface 454 and a second surface 456. The first annular wall 446 comprises a plurality of spherical shaped chambers 458 defined by a matrix 460 of integral interconnected walls 462 and thus the first annular wall 446 comprises a single, monolithic or unitary, piece. The spherical shaped chambers 458 are arranged in three layers A, B and C between the first surface 454 and the second surface 456 of the first annular wall 446. The walls 462A of the spherical shaped chambers 458A in the first layer A define the first surface 454 of the first annular wall 446 of the combustion chamber 15, the walls 462B of the spherical shaped chambers 458C in the third layer C define the second surface 456 of the first annular wall 446 of the combustion chamber 15. Adjacent spherical shaped chambers 58 share a common wall. The spherical shaped chambers 458A, 458B and 458C in each layer A, B and C are interconnected to the spherical shaped chambers 458A, 458B and 458C in each adjacent layer A, B and C by apertures extending through the walls of the spherical shaped chambers 458 for the flow of coolant D therebetween.

The walls of the spherical shaped chambers 458A in the first layer A have apertures 464A extending there-through to supply coolant D into the spherical shaped chamber 458A in the first layer A. The walls of the spherical shaped chambers 458A in the first layer A have apertures 464B extending there-through to supply coolant D into the spherical shaped chambers 458B in the second layer B. The walls of the spherical shaped chambers 458B in the second layer B have apertures 464C extending there-through to supply coolant D into the spherical shaped chambers 458C in the third layer C and the walls of the spherical shaped chambers 458C in the third layer C have apertures 464D extending there-through to supply coolant D from the spherical shaped chambers 458C in the third layer C into the combustion chamber 15. The apertures 464A are preferably arranged in the portions of the walls of the spherical shaped chambers 58A facing in an upstream direction, as shown in FIG. 16, to enable a controlled flow of coolant D into the first layer A of chambers 458A. However, the apertures 464A may be arranged in the portions of the walls of the spherical shaped chambers 458A facing in a downstream direction. The apertures 464B are preferably arranged in the walls of the spherical shaped chambers 458A facing in a downstream direction, as shown in FIG. 16, to enable a controlled flow of coolant D from the chambers 458A of first layer A into the chambers 458B in the second layer B. However, the apertures 464B may be arranged in the walls of the spherical shaped chambers 458A facing in an upstream direction. The apertures 464C are preferably arranged in the walls of the spherical shaped chambers 458B facing in an upstream direction and in the walls of the spherical shaped chambers 458B facing in a downstream direction, as shown in FIG. 16, to enable a controlled flow of coolant D from the chambers 458B in the second layer B into the chambers 458C in the third layer C. However, the apertures 464C may be arranged only in the walls of the spherical shaped chambers 58B facing in a downstream direction or only in the walls of the spherical shaped chambers 58B facing in an upstream direction. The apertures 464D are arranged in the walls of the spherical shaped chambers 458C facing in a downstream direction, as shown in FIG. 16, to enable a controlled flow of coolant D onto the second surface 456 of the first annular wall 446 to form a film of coolant D on the second surface 456 of the first annular wall 446. The controlled flow of coolant D may be a turbulent flow of coolant to enhance heat transfer.

The first annular wall 446 of the radially inner annular wall structure 440 may also be manufactured using the apparatus and methods described with reference to FIGS. 8 to 13.

In FIGS. 3, 5, 7 and 16 the centres of the polyhedron shaped chambers in each layer are spaced laterally, radially, from the centres of the polyhedron shaped chambers in the, or each, adjacent layer and the lateral, radial, extremities of the polyhedron shaped chamber in each layer are spaced laterally, radially, from the centres of the polyhedron shaped chambers in the, or each, adjacent layer. In FIG. 14 the centres of the polyhedron shaped chambers in each layer are spaced laterally, radially, from the centres of the polyhedron shaped chambers in the, or each, adjacent layer and the lateral, radial, extremities of the polyhedron shaped chamber in each layer are aligned laterally, radially, with the centres of the polyhedron shaped chambers in the, or each, adjacent layer. In FIGS. 3, 5, 7 and 16 the polyhedron shaped chambers in each layer are immediately adjacent longitudinally, axially, to another polyhedron shaped chamber in that layer. In FIG. 14 the polyhedron shaped chambers in some of the layers are not immediately adjacent longitudinally, axially, to another polyhedron shaped chamber in that layer but have polyhedron shaped chambers from one or more adjacent layers longitudinally, axially, there-between.

In each of the embodiments of the present disclosure the coolant used to cool the combustion chamber wall may be air. The air may be supplied from a compressor, e.g. the high pressure compressor, of the gas turbine engine The combustion chamber may be a gas turbine engine combustion chamber. The combustion chamber may be a tubular combustion chamber or an annular combustion chamber.

The polyhedron shaped chambers are arranged in a regular structure are tessellated and are arranged to provide a flexible, porous, first and/or second annular wall. The polyhedrons shaped chambers may be arranged in a number of arrangements to optimise heat transfer distribution through the thickness of the first and/or second annular wall and simultaneously match the pressure loss, or local mass flow, of the coolant through the first and/or second annular wall. These arrangements may be dendritic networks or ducted networks and contain impingement jets and combined impingement jets. The apertures linking the polyhedron shaped chambers may be on each adjacent face, or wall, or on selected faces, walls, of the polyhedron shaped chambers to change the direction of the flow of coolant to increase impingement cooling/heat transfer. The apertures linking the polyhedron shaped chambers are provided with controlled geometric and effective cross-sectional areas to provide the correct level of overall porosity for the required pressure drop across the first and/or second annular wall. The apertures on the first surface of the first and/or second annular wall and the throughout the first and/or second annular wall are preferably dimensioned to maximise heat transfer throughout the thickness of the first and/or second annular wall and this may include arranging to extract more heat across the regions with higher temperature gradients, e.g. the layer of polyhedron shaped chambers forming the second surface of the first and/or second annular wall. The polyhedron shaped chambers provide the first and/or second annular wall with increased mechanical strength and increased stiffness for a given weight of material. The mechanical properties, strength and stiffness, may be increased by thickness of the walls defining the polyhedron shaped chambers and/or by increasing the number of layers of polyhedron shaped chambers and/or by increasing the overall thickness of the wall. The volume, or dimensions, of the polyhedron shaped chambers in different layers may be different, for example an elongated dodecahedron shaped chamber is easily adjustable by adjusting the length of elongation of the elongated dodecahedron and the length of elongation is arranged in the radial direction of the first and/or second annular wall or the axial direction of the first and/or second annular wall. The polyhedron shaped chambers provide the first and/or second annular wall with the ability to damp combustion chamber noise, combustion chamber rumble, combustion chamber resonant frequencies or combustion chamber instabilities by adjusting the volume, increasing the volume, of the polyhedron shaped chambers in the layer of polyhedron shaped chambers forming the second surface of the first and/or second annular wall.

The use of elongated dodecahedron shaped chambers is useful to alter heat transfer through each layer of elongated dodecahedron shaped chambers. This may be achieved by adjusting the cell elongation to enhance the coolant impingement and modify the distribution of the pressure loss through the wall. The elongated dodecahedron shaped chambers are preferred because it is possible the elongated portions with different lengths to produce different volumes of the polyhedron shaped chambers in one or more of the layers, e.g. each layer could have a different length for the elongated portion.

The invention claimed is:

1. An annular combustion chamber wall, which is hollow, the annular combustion chamber wall comprising:
    a first surface located on an outer side of the annular combustion chamber wall;
    a second surface located on an inner side of the annular combustion chamber wall forming an inner side of a combustion chamber;
    a plurality of polyhedron shaped chambers defined by a matrix of integral interconnected walls, the plurality of polyhedron shaped chambers being arranged in at least two layers between the first surface and the second surface including:
        a first layer formed by the integral interconnected walls of the polyhedron shaped chambers and defining the first surface of the annular combustion chamber wall; and
        a second layer formed by the integral interconnected walls of the polyhedron shaped chambers and defining the second surface of the annular combustion chamber wall;
    a plurality of apertures extending through the integral interconnected walls of the polyhedron shaped chambers for the flow of coolant there-between, the apertures fluidly interconnecting the polyhedron shaped chambers in each layer to the polyhedron shaped chambers in each adjacent layer, adjacent polyhedron shaped chambers share a common wall, a first plurality of apertures of the plurality of apertures extending through the integral interconnected walls of the polyhedron shaped chambers in the first layer from the first surface to supply coolant into the first layer, and a second plurality of apertures of the plurality of apertures extending through the integral interconnected walls of the polyhedron shaped chambers in the second layer to the second surface to supply coolant from the second layer into the combustion chamber;
    at least one rib formed on an interior surface of at least one of the interconnected walls within at least one of the plurality of polyhedron shaped chambers, the at least one rib projecting from the interior surface towards another one of the interconnected walls that is on an opposite side of the polyhedron shaped chamber from the interior surface and into the at least one polyhedron shaped chamber, the at least one rib extending along a length of the annular combustion chamber wall; and
    a plurality of circumferential segments joined together to form the annular combustion chamber wall, each having a circumferential ends, the circumferential ends of each of the plurality of circumferential segments including a tongue or a groove configured to be inserted into a groove or to receive a tongue of an adjacent circumferential segment of the plurality of circumferential segments, the circumferential ends of each of the plurality of circumferential segments being formed of solid metal or a plurality of layers of polyhedron shaped chambers.

2. The annular combustion chamber wall as claimed in claim 1, wherein all the polyhedron shaped chambers have a same shape.

3. The annular combustion chamber wall as claimed in claim 1, wherein the polyhedron shaped chambers are selected from the group consisting of: parallelogram sided cuboid shaped chambers, square based pyramid shaped chambers, rhombic dodecahedron shaped chambers, elongated dodecahedron shaped chambers, truncated dodecahedron shaped chambers, spherical shaped chambers, spheroid shaped chambers and two types of polyhedron shaped chambers.

4. The annular combustion chamber wall as claimed in claim 3, wherein:
    the polyhedron shaped chambers are elongated dodecahedron shaped chambers, the elongated dodecahedron shaped chambers being elongated in a longitudinal direction of the annular combustion chamber, the annular combustion chamber wall includes three layers of the elongated dodecahedron shaped chambers, and the elongated dodecahedron shaped chambers in the first layer are adjacent to the elongated dodecahedron shaped chambers in the second layer, and the elongated dodecahedron shaped chambers in a third layer are longitudinally located between two rows of the elongated dodecahedron shaped chambers in the first layer and two rows of the elongated dodecahedron shaped chambers in the second layer.

5. The annular combustion chamber wall as claimed in claim 3, wherein the polyhedron shaped chambers are rhombic dodecahedron shaped chambers.

6. The annular combustion chamber wall as claimed in claim 1, wherein a thickness of a wall of each polyhedron shaped chamber is in a range of 0.2 to 2 mm.

7. The annular combustion chamber wall as claimed in claim 1, wherein a distance between walls of the polyhedron shaped chambers is 1 to 4 mm.

8. The annular combustion chamber wall as claimed in claim 1, wherein one or two layers of polyhedron shaped chambers are provided between the first layer and the second layer.

9. The annular combustion chamber wall as claimed in claim 1, wherein the first surface of the annular combustion chamber wall is multi-faceted and the facets are defined by walls of the polyhedron shaped chambers in the first layer.

10. The annular combustion chamber wall as claimed in claim 9, wherein a portion of the facets defined by the walls of the polyhedron shaped chambers in the first layer face in an upstream direction, the portion of the facets facing in the upstream direction include apertures extending therethrough to supply coolant into the first layer.

11. The annular combustion chamber wall as claimed in claim 10, wherein the portion of the facets facing in the upstream direction have a same cross-sectional area as the portion of the facets facing in a downstream direction, such that the portion of the facets facing in the downstream direction form scoops to supply coolant through the apertures in the portion of the facets facing in the upstream direction into the first layer.

12. The annular combustion chamber wall as claimed in claim 1, wherein the first surface has at least one rib extending from the first surface in a direction away from the second surface.

13. The annular combustion chamber wall as claimed in claim 1, wherein the first surface is corrugated.

14. The annular combustion chamber wall as claimed in claim 1, wherein:
the second surface is cylindrical, and
downstream walls of the polyhedron shaped chambers defining the second surface include apertures extending through the downstream walls to supply coolant from the second layer in a downstream direction into the annular combustion chamber.

15. The annular combustion chamber wall as claimed in claim 14, wherein the apertures in the downstream walls of the polyhedron shaped chambers defining the second surface have a same cross-sectional area as the downstream walls of the polyhedron shaped chambers.

16. The annular combustion chamber wall as claimed in claim 14, wherein the apertures extending through the downstream walls are fan shaped and the fan shape diverges in a direction perpendicular to the downstream direction.

17. The annular combustion chamber wall as claimed in claim 1, wherein a plurality of the polyhedron shaped chambers have at least one rib extending from at least one of the walls of the polyhedron shaped chambers into respective polyhedron shaped chambers.

18. The annular combustion chamber wall as claimed in claim 1, wherein the combustion chamber wall is formed from a superalloy selected from a group consisting of: a nickel base superalloy, a cobalt base superalloy and an iron base superalloy.

19. The annular combustion chamber wall as claimed in claim 1, wherein a thermal barrier coating is provided on the second surface of the annular combustion chamber wall.

20. A method of manufacturing an annular combustion chamber wall, which is hollow, the annular combustion chamber wall including: (i) a first surface and a second surface, and (ii) a plurality of polyhedron shaped chambers defined by a matrix of integral interconnected walls, the plurality of polyhedron shaped chambers being arranged in at least two layers between the first surface and the second surface, a first layer formed by the integral interconnected walls of the polyhedron shaped chambers and defining the first surface of the annular combustion chamber wall, and a second layer formed by the integral interconnected walls of the polyhedron shaped chambers and defining the second surface of the annular combustion chamber wall, the polyhedron shaped chambers in each layer are fluidly interconnected to the polyhedron shaped chambers in each adjacent layer by apertures extending through the integral interconnected walls of the polyhedron shaped chambers for the flow of coolant there-between, adjacent polyhedron shaped chambers share a common wall, a first plurality of apertures of the plurality of apertures extending through the integral interconnected walls of the polyhedron shaped chambers in the first layer from the first surface to supply coolant into the first layer, and a second plurality of apertures of the plurality of apertures extending through the integral interconnected walls of the polyhedron shaped chambers in the second layer to the second surface to supply coolant from the second layer into the combustion chamber, the method comprising steps of:

(a) depositing layers of a metal sequentially one upon the other to form layers of a spiral wall, depositing each layer of metal in a spiral pathway, and (b) joining ends of the spiral wall to form the annular combustion chamber wall, the ends of the spiral wall being at opposite ends of the spiral pathway.

21. The method as claimed in claim 20, wherein step (b) includes rolling the spiral wall into a ring before joining the ends of the spiral wall together.

22. The method as claimed in claim 20, wherein step (a) includes:

(i) depositing a first layer of a metal powder onto a platform, (ii) directing a radiation beam in at least one spiral pathway onto the first layer of metal powder deposited in step (i) to melt and sinter the metal powder to form a first layer of the spiral wall, (iii) depositing a second layer of the metal powder onto the previously deposited layer of metal powder, (iv) directing the radiation beam in at least one spiral pathway onto the second layer of metal powder deposited in step (iii) to melt and sinter the metal powder to form a second layer of the spiral wall and to bond the second layer of metal powder to the previously deposited first layer of metal powder, and (v) repeating steps (iii) and (iv) a plurality of times to build up the spiral wall.

23. The method as claimed in claim 22, wherein step (ii) is selected from a group consisting of: directing a laser beam onto the first layer of metal powder, directing a microwave beam onto the first layer of metal powder, and directing an electron beam onto the first layer of metal powder.

24. The method as claimed in claim 22, wherein step (iv) is selected from a group consisting of: directing a laser beam onto the second layer of metal powder, directing a microwave beam onto the second layer of metal powder, and directing an electron beam onto the second layer of metal powder.

25. A method of manufacturing an annular combustion chamber wall, which is hollow, the annular combustion chamber wall including: (i) a first surface located on an outer side of the annular combustion chamber wall, (ii) a second surface located on an inner side of the annular combustion chamber wall forming an inner side of a combustion chamber, (iii) a plurality of polyhedron shaped chambers defined by a matrix of integral interconnected walls, the plurality of polyhedron shaped chambers being arranged in at least two layers between the first surface and the second surface including a first layer formed by the integral interconnected walls of the polyhedron shaped chambers and defining the first surface of the annular combustion chamber wall, and a second layer formed by the integral interconnected walls of the polyhedron shaped chambers and defining the second surface of the annular combustion chamber wall, (iv) a plurality of apertures extending through the integral interconnected walls of the polyhedron shaped chambers for the flow of coolant there-between, the apertures fluidly interconnecting the polyhedron shaped chambers in each layer to the polyhedron shaped chambers in each adjacent layer, adjacent polyhedron shaped chambers share a common wall, a first plurality of apertures of the plurality of apertures extending through the integral interconnected walls of the polyhedron shaped chambers in the first layer from the first surface to supply coolant into the first layer, and a second plurality of apertures of the plurality of apertures extending through the integral interconnected walls of the polyhedron shaped chambers in the second layer to the second surface to supply coolant from the second layer into the combustion chamber, (v) at least one rib formed on an interior surface of at least one of the interconnected walls within at least one of the plurality of polyhedron shaped chambers, the at least one rib projecting from the interior surface towards another one of the interconnected walls that is on an opposite side of the polyhedron shaped chamber from the interior surface and into the at least one polyhedron shaped chamber, the at least one rib extending along a length of the annular combustion chamber wall, and (vi) a plurality of circumferential segments joined together to form the annular combustion chamber wall, each having a circumferential ends, the circumferential ends of each of the plurality of circumferential segments including a tongue or a groove configured to be inserted into a groove or to receive a tongue of an adjacent circumferential segment of the plurality of circumferential segments, the circumferential ends of each of the plurality of circumferential segments being formed of solid metal or a plurality of layers of polyhedron shaped chambers, the method comprising:

manufacturing the annular combustion chamber wall by additive layer manufacture;

manufacturing the annular combustion chamber wall in circumferential segments by the plurality of circumferential segments joined together; and building the annular combustion chamber wall by assembling each of the plurality of circumferential segments layer by layer and joining the circumferential ends of each of the plurality of circumferential segments together.

26. The method as claimed in claim 25, wherein the additive layer manufacture is selected from a group consisting of: directing a laser beam onto layers of metal powder, directing a microwave beam onto layers of metal powder, and directing an electron beam onto layers of metal powder.

27. The method as claimed in claim 25,
wherein the polyhedron shaped chambers are one of rhombic dodecahedron shaped chambers and elongated dodecahedron shaped chambers, and
the method further comprising building the walls of the polyhedron shaped chambers at an angle of 45°.

28. An annular combustion chamber wall, which is hollow, the annular combustion chamber wall comprising:
a first surface located on an outer side of the annular combustion chamber wall;
a second surface located on an inner side of the annular combustion chamber wall forming an inner side of a combustion chamber;
a plurality of polyhedron shaped chambers defined by a matrix of integral interconnected walls, the plurality of polyhedron shaped chambers being arranged in at least two layers between the first surface and the second surface including:
  a first layer formed by the integral interconnected walls of the polyhedron shaped chambers and defining the first surface of the annular combustion chamber wall; and
  a second layer formed by the integral interconnected walls of the polyhedron shaped chambers and defining the second surface of the annular combustion chamber wall;
a plurality of apertures extending through the integral interconnected walls of the polyhedron shaped chambers for the flow of coolant there-between, the apertures fluidly interconnecting the polyhedron shaped chambers in each layer to the polyhedron shaped chambers in each adjacent layer, adjacent polyhedron shaped chambers share a common wall, a first plurality of apertures of the plurality of apertures extending through the integral interconnected walls of the polyhedron shaped chambers in the first layer from the first surface to supply coolant into the first layer, and a second plurality of apertures of the plurality of apertures extending through the integral interconnected walls of the polyhedron shaped chambers in the second layer to the second surface to supply coolant from the second layer into the combustion chamber; and
a plurality of circumferential segments joined together to form the annular combustion chamber wall, each having a circumferential ends, the circumferential ends of each of the plurality of circumferential segments including a tongue or a groove configured to be inserted into a groove or to receive a tongue of an adjacent circumferential segment of the plurality of circumferential segments, the circumferential ends of each of the plurality of circumferential segments being formed of a plurality of layers of polyhedron shaped chambers.

* * * * *